(12) United States Patent
Klein et al.

(10) Patent No.: US 10,936,037 B2
(45) Date of Patent: *Mar. 2, 2021

(54) MULTI-POWER RAIL POWER SUPPLY UNIT MISMATCH DETECTION SYSTEM

(71) Applicant: Dell Products L.P., Round Rock, TX (US)

(72) Inventors: Craig Anthony Klein, Elgin, TX (US); John Erven Jenne, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 159 days.

This patent is subject to a terminal disclaimer.

(21) Appl. No.: 16/178,830

(22) Filed: Nov. 2, 2018

(65) Prior Publication Data

US 2019/0073015 A1    Mar. 7, 2019

Related U.S. Application Data

(63) Continuation-in-part of application No. 16/014,825, filed on Jun. 21, 2018, which is a continuation of application No. 15/093,312, filed on Apr. 7, 2016, now Pat. No. 10,037,066.

(51) Int. Cl.
*G06F 1/26* (2006.01)
*G06F 1/3206* (2019.01)

(52) U.S. Cl.
CPC ............ *G06F 1/3206* (2013.01); *G06F 1/263* (2013.01)

(58) Field of Classification Search
None
See application file for complete search history.

(56) References Cited

U.S. PATENT DOCUMENTS

| 5,739,596 A * | 4/1998 | Takizawa ................. G06F 1/263 307/64 |
| 6,757,774 B1 * | 6/2004 | Benson .................... G06F 1/263 361/695 |
| 10,037,066 B2 | 7/2018 | Jenne et al. |
| 2005/0248889 A1 | 11/2005 | Chen et al. |
| 2009/0254768 A1 | 10/2009 | Livescu et al. |
| 2010/0038963 A1 | 2/2010 | Shetty et al. |
| 2010/0231252 A1 * | 9/2010 | Goel ................. G01R 31/31723 324/750.3 |
| 2011/0187402 A1 * | 8/2011 | Xie ......................... G01R 31/40 324/764.01 |
| 2011/0191618 A1 | 8/2011 | Berke et al. |
| 2013/0106190 A1 | 5/2013 | Lin et al. |

(Continued)

*Primary Examiner* — Danny Chan
(74) *Attorney, Agent, or Firm* — Haynes and Boone, LLP

(57) ABSTRACT

A multi-power rail PSU includes a first power rail coupled to first PSUs, and a second power rail coupled to second PSUs. A controller subsystem receives a request to enable the first power rail and the second power rail and, in response, enables one of the first PSUs to transmit power to the first power rail, and enables one of the second PSUs to transmit power to the second power rail. The controller subsystem then performs respective PSU mismatch checks on the first PSUs and the second PSUs, and identifies compatible first PSUs for the first power rail, and compatible second PSUs for the second power rail. The controller subsystem then enables transmission of power to the first power rail from the compatible first PSUs, and enables transmission of power to the second power rail from the compatible second PSUs.

20 Claims, 7 Drawing Sheets

(56) References Cited

U.S. PATENT DOCUMENTS

| | | |
|---|---|---|
| 2014/0143571 A1* | 5/2014 | Lin .................... G06F 1/263 |
| | | 713/323 |
| 2015/0006943 A1 | 1/2015 | Suzuki |
| 2015/0082055 A1 | 3/2015 | Grout et al. |
| 2016/0013643 A1* | 1/2016 | Park .................... H02J 1/08 |
| | | 713/300 |
| 2016/0282892 A1 | 9/2016 | Saavedra et al. |
| 2018/0004276 A1* | 1/2018 | Wong ................ G06F 1/3234 |
| 2018/0299942 A1 | 10/2018 | Jenne et al. |
| 2019/0181622 A1* | 6/2019 | Xia .................... H02J 9/06 |

* cited by examiner

MULTI-POWER RAIL POWER SUPPLY UNIT MISMATCH DETECTION SYSTEM

CROSS-REFERENCE TO RELATED APPLICATIONS

This application is a Continuation-In-Part application to U.S. Utility application Ser. No. 16/014,825, filed on Jun. 21, 2018, entitled "POWER SUPPLY UNIT MISMATCH DETECTION SYSTEM", which is a continuation of U.S. Utility application Ser. No. 15/093,312, filed Apr. 7, 2016, entitled "POWER SUPPLY UNIT MISMATCH DETECTION SYSTEM", now U.S. Pat. No. 10,037,066 that was issued on Jul. 31, 2018. the disclosures of which are incorporated herein by reference in their entirety.

BACKGROUND

The present disclosure relates generally to information handling systems, and more particularly to a Power Supply Unit (PSU) mismatch detection system in an information handling system including multiple power rails.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Customization of information handling systems for various uses is ever increasing, which drives a complete spectrum of power requirements into the design of power supplies for information handling systems. One result of allowing for customization is that a variety of power supplies might be physically capable of connecting to a particular system, and those power supplies may have differing features that can result in incompatibility. This incompatibility may cause issues such as, for example, unstable power delivery, power supply shutdown, or even system damage depending on the system and the incompatibility. One solution of preventing mismatch between power supplies is providing a physical lock out mechanism such that only particular power supplies may be connected to power supply slots on the system. While this solution prevents power supplies that are incompatible with the system from being used with the system, it does not address the issue of power supplies that are incompatible with each other but that are each compatible with the system and it does not address different generations of PSUs that are mechanically identical. In some situations, PSU mismatch algorithms are used to detect incompatible power supplies before enabling main power to those power supplies. However, those PSU mismatch algorithms are performed by a controlling entity such as a Baseboard Management Controller (BMC) that is powered by an auxiliary power rail. Booting the system and performing the PSU mismatch using the BMC is a relatively slow process that extends the time required for main power enablement by as much as several minutes.

Accordingly, it would be desirable to provide an improved PSU mismatch detection system.

SUMMARY

According to one embodiment, an Information Handling System (IHS) includes a processing system; and a memory system that is coupled to the processing system and that includes instructions that, when executed by the processing system, cause the processing system to provide at least one controller that is configured to: receive a request to enable a first power rail and a second power rail; enable transmission of power to the first power rail from a PSU that is coupled to a first of a plurality of first PSU slots, and enable transmission of power to the second power rail from a PSU that is coupled to a first of a plurality of second PSU slots; perform a first power rail PSU mismatch check on respective PSUs coupled to the plurality of first PSU slots, and perform a second power rail PSU mismatch check on respective PSUs coupled to the plurality of second PSU slots, wherein the first PSU mismatch check is configured to identify a compatibility of the PSUs coupled to the plurality of first PSU slots using PSU parameters associated with each of the PSUs coupled to the plurality of first PSU slots, and wherein the second PSU mismatch check is configured to identify a compatibility of the PSUs coupled to the plurality of second PSU slots using PSU parameters associated with each of the PSUs coupled to the plurality of second PSU slots; determine one or more compatible PSUs that are coupled to the plurality of first PSU slots and that belong to a first compatible PSU configuration identified using the first power rail PSU mismatch check, and determine one or more compatible PSUs that are coupled to the plurality of second PSU slots and that belong to a second compatible PSU configuration identified using the second power rail PSU mismatch check; and enable transmission of power to the first power rail from the one or more compatible PSUs that are coupled to the plurality of first PSU slots, and enable transmission of power to the second power rail from the one or more compatible PSUs that are coupled to the plurality of second PSU slots.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
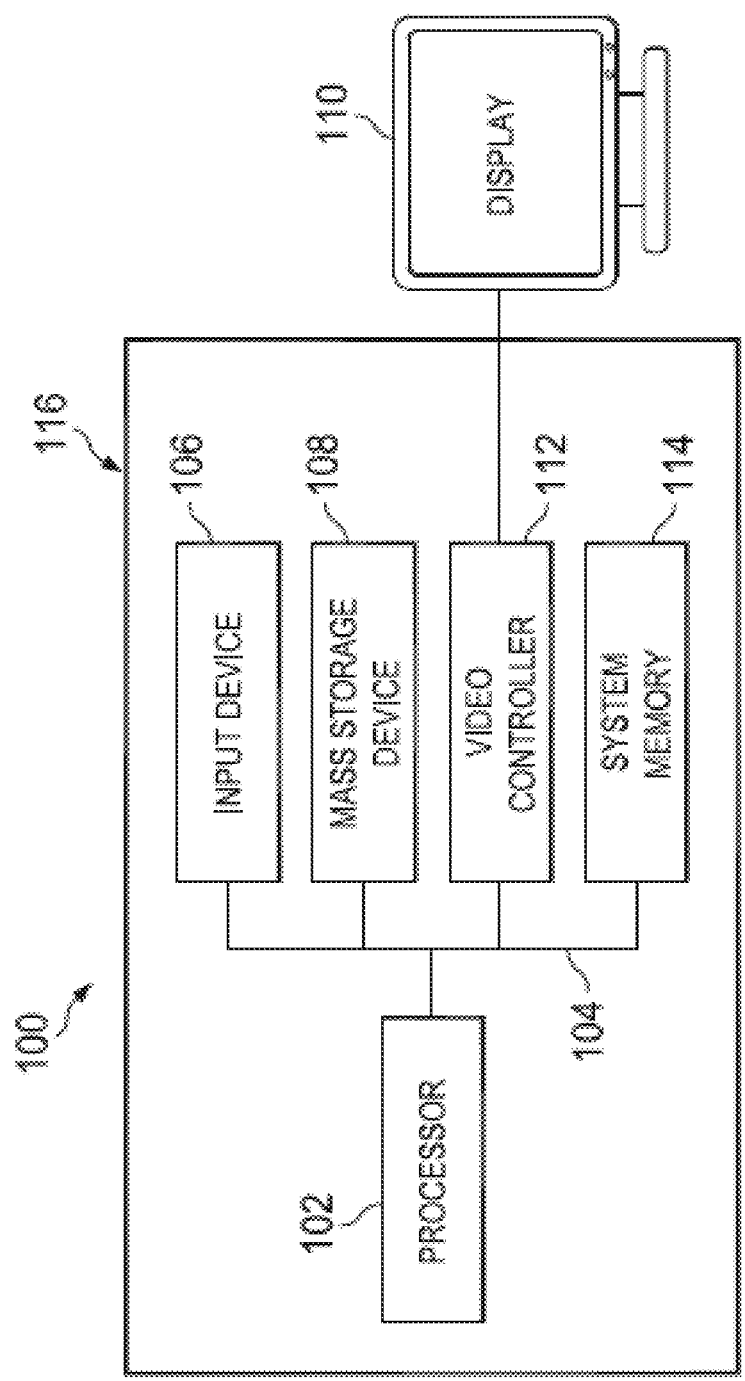
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
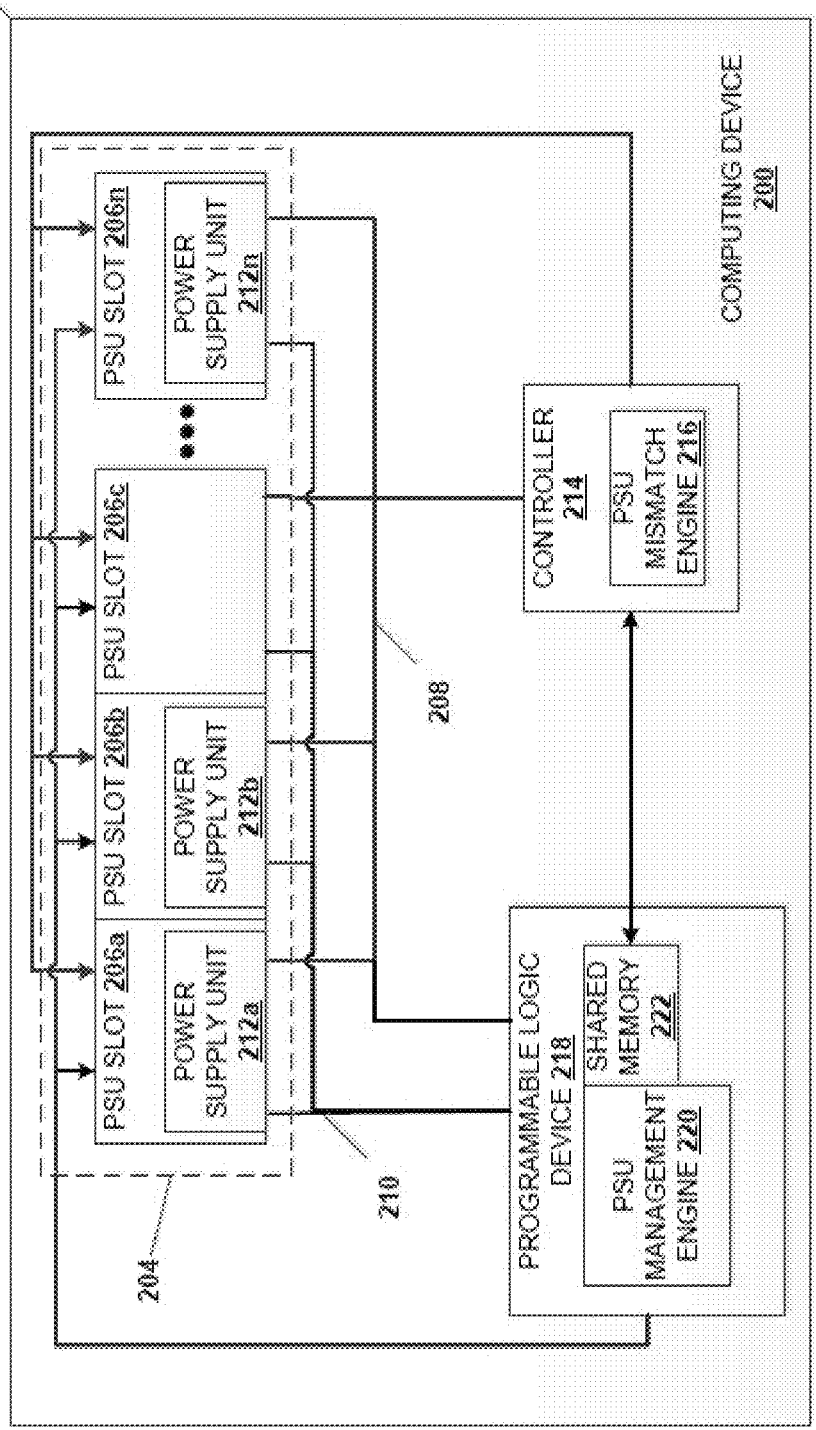
FIG. 2 is a schematic view illustrating an embodiment of a computing device provided the Power Supply Unit (PSU) mismatch detection system of the present disclosure.

Referring now to FIG. 2, an embodiment of a Power Supply Unit (PSU) mismatch detection system provided in a computing device 200 is illustrated. In an embodiment, the computing device 200 may be the IHS 100 discussed above with reference to FIG. 1 and/or may include some or all of the components of the IHS 100. In specific embodiments discussed below, the computing device 200 is described as a server, although other computing devices such as desktop computing devices, laptop/notebook computing devices, tablet computing devices, mobile phones, networking devices (e.g., switches, router, etc.), storage systems, and/or other computing devices known in the art may benefit from the teachings of the present disclosure and thus will fall within its scope. In the illustrated embodiment, the computing device 200 includes a chassis 202 that houses the components of the computing device 200, only some of which are illustrated in FIG. 2. Furthermore, while the components of the computing device 200 are illustrated as housed in a single chassis, the computing device 200 may be distributed across multiple chassis while remaining within the scope of the present disclosure.

In the illustrated embodiment, the chassis 202 houses a power system 204 that includes a plurality of power supply unit (PSU) slots 206a, 206b, 206c, and 206n. Each of the plurality of PSU slots 206a-206n is configured to receive power from a power source (not illustrated), while being coupled to a main power rail 208 and an auxiliary power rail 210. Furthermore, each of the plurality of PSU slots 206a-206n is configured to couple to a respective power supply unit (PSU) 212a, 212b, and 212n that are configured to transmit power from the power source to the main power rail 208 and the auxiliary power rail 210. For example, in the illustrated embodiment, the PSU slot 206a is coupled with PSU 212a, the PSU slot 206b is coupled with PSU 212b, and the PSU slot 206n is coupled with PSU 212n, while the PUS slot 206c is not coupled with a PSU. While a specific example is shown of PSU slots coupled to respective PSUs, one skilled in the art will recognize that other configurations of the number of PSU slots coupled with PSUs may benefit from the present disclosure and thus fall within its scope. Furthermore, one skilled in the art will recognize that the power system 204 may include power connectors, power adapters, and/or other power system components known in the art.

The chassis 202 also houses a controller 214 that is coupled to the main power rail 208 and each of the plurality of PSU slots 206a-206n. In an embodiment, the controller may be coupled to the auxiliary power rail 210 and initially power off of the auxiliary power rail but switches over to the main power rail 208 once the main power rail 208 is activated. In an embodiment, the controller 214 may include a Baseboard Management Controller (BMC), an Integrated DELL Remote Access Controller (iDRAC), and/or other service processor known in the art. For example, the controller 214 may include a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the controller 214 to provide a PSU mismatch engine 216 that is configured to perform the functions of the PSU mismatch engine and controllers discussed below including, for example, the performance of the PSU mismatch algorithm that is discussed with regard to the method 300 below.

The chassis 202 also houses a programmable logic device 218 that is coupled to the main power rail 208, the auxiliary power rail 210, and the plurality of PSU slots 206a-206n. For example, the programmable logic device 218 may include a processing system (not illustrated) and a memory system (not illustrated) that includes instructions that, when executed by the processing system, cause the programmable logic device 218 to provide a PSU management engine 220 that is configured to perform the functions of the PSU management engines and programmable logic devices discussed below including, for example, the system power management for the PSU mismatch algorithm that is discussed with regard to the method 300 below. In an embodiment, the programmable logic device 218 may include programmable logic that is configured to cause the programmable logic device 218 to provide the PSU management engine 220. For example, the programmable logic device 218 may be a complex programmable logic device (CPLD). In an embodiment, the programmable logic device 218 may include a shared memory 222 that, as discussed below, may be shared between the programmable logic device 218 and the controller 214. As illustrated, the programmable logic device 218 includes the shared memory 222; however, the shared memory 222 may be separate from the programmable logic device 218 (e.g., provided by the controller 214, provided by a stand-alone memory device accessible by each of the programmable logic device 218 and the controller 214, etc.). While specific components of the computing device 200 have been illustrated and described, one of skill in the art in possession of the present disclosure will recognize that a variety of other components may be provided in the computing device 200 to perform conventional computing device functions based on the desired functionality of the computing device 200 while remaining within the scope of the present disclosure.

Figure 3:
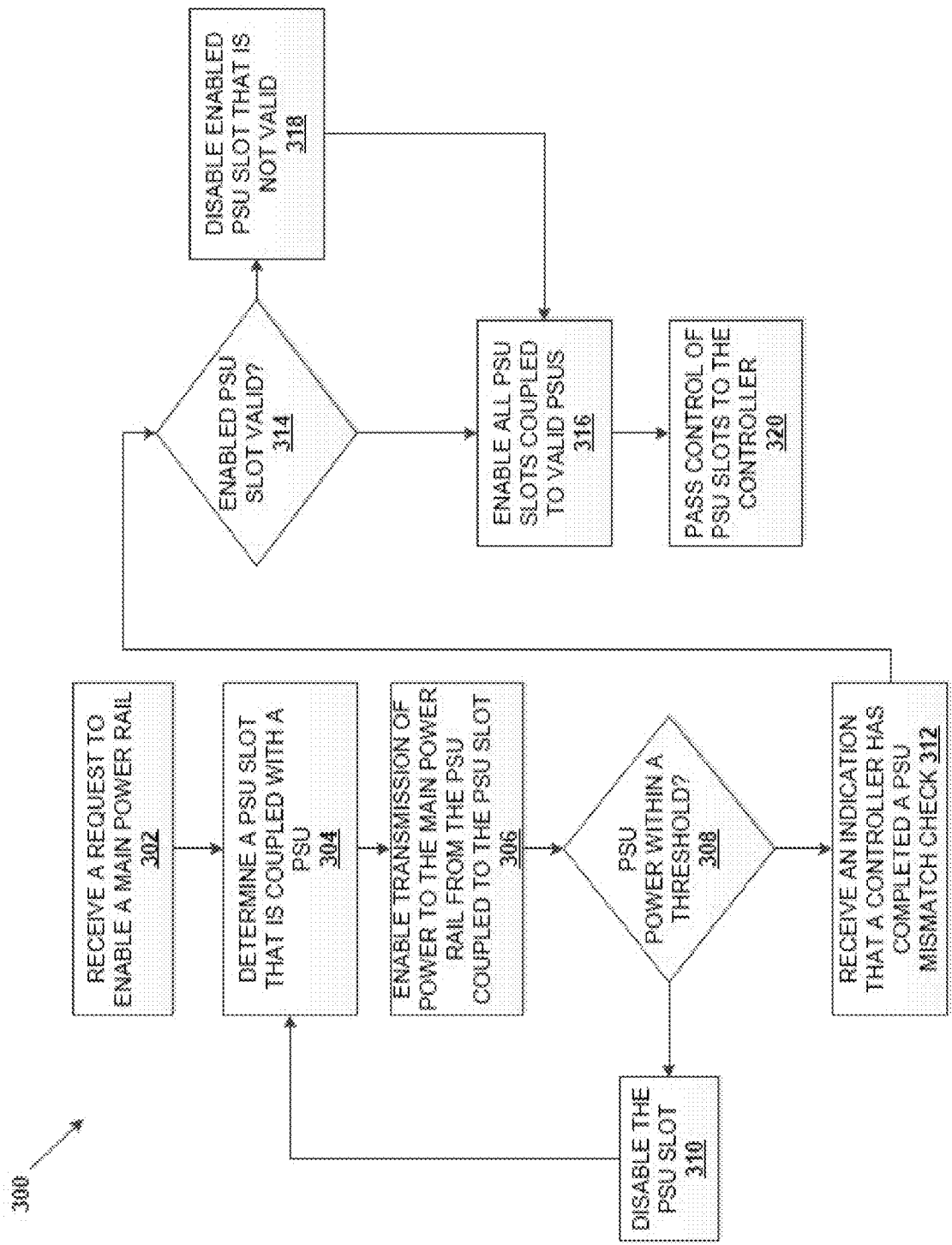
FIG. 3 is a flow diagram illustrating an embodiment of a method for providing PSU mismatch detection for the computing device of FIG. 2.

Referring now to FIG. 3, an embodiment of a method 300 of preventing PSU mismatch is illustrated. As discussed below, a programmable logic device coupled to an auxiliary power rail may manage a plurality of PSUs (e.g., coupled to PSU slots) that may provide power to the auxiliary power rail and a main power rail of a computing device when enabled. In some embodiments, the programmable logic device may initially enable a single PSU before a controller has been booted and completed a PSU mismatch check to provide power to the main power rail, thus powering a controller that performs the PSU mismatch check for all of the PSUs coupled to the system. In other embodiments, the programmable logic device may enable a single PSU prior to the controller booting and completing a PSU mismatch check because the controller does not initialize quickly enough and the system is configured to minimize the powering-on time period. Upon completion of the PSU mismatch check, the controller may report to the programmable logic device all PSUs belonging to the valid PSU configuration on the system. If the PSU that is currently enabled to allow the controller to perform the PSU mismatch check is a PSU incompatible with the valid PSU configuration according to the PSU mismatch check, the programmable logic device may disable the PSU by removing power from the main power rail (while if that PSU is a PSU, power to the main power rail from that PSU may be maintained). The removal of power does not affect data loss because the system may be in power-on self-test. The programmable logic device may then enable all of the PSUs coupled to the system that belong to the valid PSU configuration according to the PSU mismatch check to provide power to the main power rail. The method 300 prevents PSUs that are mismatched and/or incompatible with each other or the system from being enabled to provide power to the main power rail at the same time, which may prevent errors, damage to the computing device, and other issues that result from mismatched power supplies. The systems and methods may also free the system from requiring auxiliary power rail circuitry for the controller that takes up valuable space in the computing device.

Referring to FIG. 3, the method 300 begins at block 302 where a request to enable power on a main power rail of a computing device is received. In an embodiment, at block 302 a request to enable power to the main power rail 208 of the computing device 200 is received by the programmable logic device 218. In an embodiment, the auxiliary power rail 210 may be enabled prior to receiving the request to enable the main power rail 208. Therefore, the programmable logic device 218 coupled to the auxiliary power rail 210 is enabled prior to receiving the request to enable the main power rail 208. As a specific example, the programmable logic device 218 is powered on, started, initialized, and/or otherwise enabled when the auxiliary power rail 210 of the computing device 200 is enabled. When the programmable logic device 218 is enabled, the programmable logic device 218 may initialize a PSU slot management bits in the shared memory 222 so that all values stored in the shared memory 222 are logically false.

Figure 4:
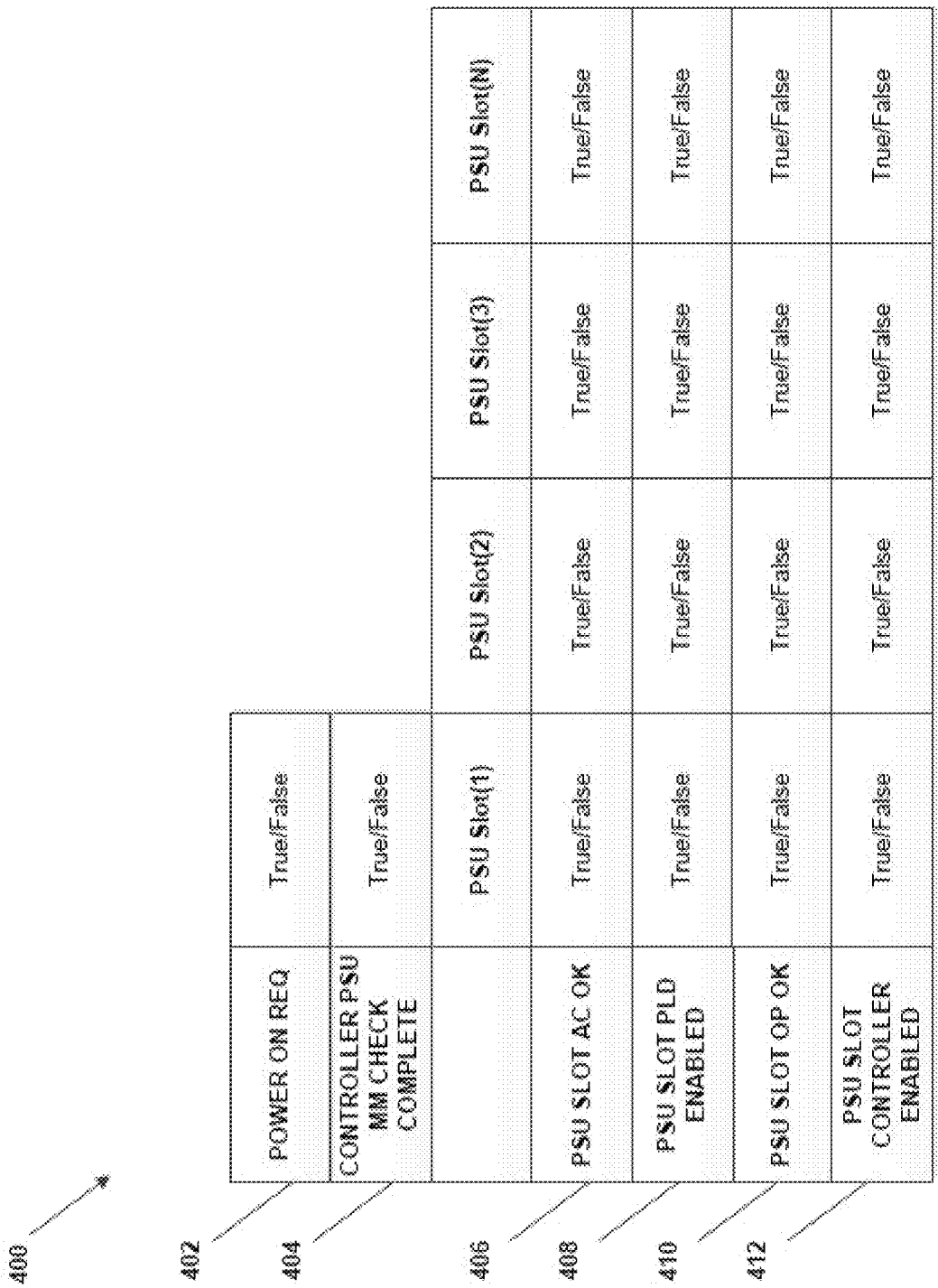
FIG. 4 is a table illustrating an embodiment of a data structure for PSU management that may be stored in a memory of the computing system of FIG. 2.

FIG. 4 illustrates an example of a PSU slot management table 400 which represents the bits stored in the shared memory 222 (e.g., registers) and/or hardware signals received from PSUs with combinational logic of the programmable logic device 218. The PSU slot management table 400 may represent a power on request bit 402 that indicates to the programmable logic device 218 to enable power to the main power rail 208 when the power on request bit 402 is set to logically true. The PSU slot management table 400 may include a mismatch check complete bit 404, which when set to logically true indicates to the programmable logic device 218 when the PSU mismatch check has been completed by the controller 214. The PSU slot management table 400 may represent a bit for each PSU slot that indicates whether the PSU slot has input power. The presence of input power may indicate whether the PSU slot is coupled to a PSU. For example, row 406 labeled "PSU Slot AC OK" of the PSU management table 400 represents each bit that indicates whether PSU slot(1), PSU slot(2), PSU slot(3), and PSU slot(N) have input power (i.e., those slots may have input power when their respective bits are set to logically true.) The PSU slot management table 400 may also represent bits that will cause hardware logic of the programmable logic device 218 to enable, each PSU slot coupled to a PSU to provide power to the main power rail 208. For example, row 408 of the PSU management table 400 indicates whether the programmable logic device 218 has enabled PSU slot(1), PSU slot(2), PSU slot(3), and PSU slot(N) (e.g., if a bit is set to logically true in row 408, the respective PSU slot may be enabled to provide power to the main power rail 402.) The PSU slot management table 400 may also represent a hardware signal for each PSU slot that indicates whether the PSU slot output power meets a threshold. For example, a PSU with a 12V main power output could have a threshold of +/−8% which corresponds to a valid main power output range of 11.04V to 12.96V. The PSU can monitor its own main power output and asserts a logically true or false signal depending on whether the output power is within the valid main power output range. For example, row 410 of the PSU management table 400 indicates whether PSU slot(1), PSU slot(2), PSU slot(3), and PSU slot(N) have output power that meets the threshold (e.g., that output power meets the threshold when the respective bits are set to logically true.) The PSU slot management table 400 may also represent a bit for each PSU slot in which the controller 214 may store a logically true or false value to indicate whether a respective PSU slot is coupled with a PSU of a valid PSU configuration after the PSU mismatch check. For example, row 412 of the PSU management table 400 indicates whether the PSU slot(1), PSU slot(2), PSU slot(3), and PSU slot(N) is coupled to PSUs of a valid PSU configuration by storing a logically true bit (i.e., associated with a PSU of a valid PSU configuration) or false bit (i.e., associated with a PSU of an invalid PSU configuration) for each PSU slot.

After the PSU slot management table 400, which represents the bits in shared memory 222 and the hardware signals, has been initialized by the programmable logic device 218 to logically false values, the programmable logic device 218 may monitor the computing device 200 until the request to enable power to the main power rail 208 is received at block 302. For example, the programmable logic device 218 may monitor the power via the request bit 402 represented by the PSU management table 400 in the shared memory 222 until the power on request bit 402 is set to a logically true value indicating the request to enable power. For example, the controller 214 may set the power on request bit 402 to a logically true value if the controller 214 had previously booted on from auxiliary power. Otherwise, the programmable logic device 218 may monitor hardware signals such as a hardware signal from the front panel power button. In another example, a peripheral control hub (PCH) may be set to automatically request power on whenever power is available and assert a hardware signal to the programmable logic device 218, which may set the power on request bit 402 to a logically true value.

The method 300 then proceeds to block 304 where a PSU slot is determined to be coupled with a PSU. In an embodiment, at block 304 the programmable logic device 218 may determine that is PSU is coupled to a PSU slot of the plurality of PSU slots 206a-206n. In an embodiment, the programmable logic device 218 may sequentially check each PSU slot 206a-206n for a PSU until the programmable logic device 218 determines that a PSU Is coupled to at least one PSU slot. For example, the programmable logic device 218 may check PSU slot 206a, determine that the PSU 212a is coupled to the PSU slot 206a, and then select the PSU slot 206a to be enabled as described further below. If a PSU slot is not coupled to a PSU (e.g., the PSU slot 206c), then the programmable logic device 218 may proceed to check the next PSU slot until the programmable logic device 218 finds a PSU slot that is coupled with a PSU that can provide main power to the main power rail 208.

In an embodiment, at block 304 the programmable logic device 218 may determine whether a PSU slot of the plurality of PSU slots 206a-206n has input power enabled. For example, the programmable logic device 218 may check a bit in row 406 of the PSU management table 400 for PSU slot(1), which may correspond to PSU slot 206a, and if the programmable logic device 218 reads a logically true value, then the programmable logic device 218 may determine that the PSU slot 206a has input power and therefore that a PSU is coupled to the PSU slot 206a. If the programmable logic device 218 reads a logically false value in row 406 for PSU slot(1), the programmable logic device may increment a PSU slot count to PSU slot(2) (e.g., PSU slot 206b), check the bit stored in row 406 for PSU slot(2) for a logically true or false value, and so on until the programmable logic device 218 reads a logically true value that indicates a PSU is coupled to one of the plurality of PSU slots 206a-206n.

The method 300 then proceeds to block 306, where transmission of power is enabled to the main power rail from the PSU that was determined to be coupled to the PSU slot at block 304. In an embodiment, at block 306, in response to determining that the PSU slot 206a is coupled to the PSU 212a at block 306, the programmable logic device 218 then enables the transmission of power to the main power rail 208 from PSU 212a coupled to PSU slot 206a. For example, the programmable logic device 218 may set the bit in row 408 for PSU slot(1) of the PSU management table 400 to a logically true value, which has the effect of "turning on" PSU slot 206a to enable power from the PSU 212a to the main power rail 208.

The method 300 then proceeds to decision block 308, where it is determined whether the power provided to the main power rail meets a threshold. In an embodiment, at decision block 308, the programmable logic device 218 determines whether the power being transmitted to the main power rail 208 from PSU 212a coupled to PSU slot 206a meets a threshold. For example, a PSU with a 12V main power output could have a threshold of +/−8%, which corresponds to a valid main power output range of 11.04V to 12.96V. The PSU may monitor its own main power output and asserts a logically true or false signal depending on whether the output power is within the valid main power output range. The programmable logic device 218 may reference the PSU management table 400 at row 410 (e.g., receive hardware signals from the PSU) and determine whether the bit for the PSU slot(1) is set to a logically true or false value. If the bit for PSU slot(1) is set to logically false, then the programmable logic device 218 may determine that the PSU slot 206a output power to the main power rail 208 does not meet the threshold. If the bit for PSU slot 206 is set to logically true, then the programmable logic device 218 may determine that the PSU slot 206a output power to the main power rail 208 meets the threshold. If the programmable logic device 218 determines that the output power from the PSU 212a coupled to the PSU slot 206a does not meet the threshold, then method 300 proceeds to block 310 where power from the PSU 212a to the main power rail is disabled. In an embodiment, the programmable logic device 218 may disable power from the PSU 212a in the PSU slot 206a to the main power rail 208. For example, the programmable logic device 218 may reference the PSU management table 400 and set the bit for PSU slot(1) in row 408 to a logically false value, which may be a disabled state that prevents the PSU 212a from providing power to the main power rail 208 through the PSU slot 206a. The method 300 may then return to block 304 to determine a different PSU slot that is coupled with a PSU substantially as discussed above.

If at decision block 308, it is determined that PSU output power to the main power rail meets the threshold, then the method 300 proceeds to block 312 where an indication is received that a controller has completed a PSU mismatch check. In an embodiment in response to the transmission of power being enabled to the main power rail 208 at block 308 and/or the auxiliary power rail, the controller 214 may initialize and begin performing a variety of actions the controller 214 is programmed to perform including, for example, performing a PSU mismatch check using the PSU mismatch engine 216, monitoring temperature, monitor fan speeds, monitor communication parameters, and/or other controller based routines known in the art. For example, the PSU mismatch check may determine whether any issues will arise if a combination of PSUs 212a, 212b, and 212n installed on the computing device 200 provide power to the main power rail at the same time. Specifically, the PSU mismatch check may compare parameters between the PSUs and between the PSUs and the system. The controller may determine parameters of the PSUs and system and reference a table stored in memory and/or hard coded logic to know which combinations are valid. For example, the controller 214 may determine parameters for each PSU such as PSU models supported by the system, PSU output power capability, PSU generation, PSU output voltage, PSU hardware and firmware versions and other PSU and system parameters known in the art. The PSU mismatch check may prioritize certain features as well in determining a valid PSU configuration. For, example if a first PSU slot has an 1100 W PSU installed and a second PSU slot has a 495 W PSU installed, the PSU mismatch check may determine the combination of the PSUs enabled together could lead to an unexpected shut down of the system due to their power output difference. Each of them enabled alone would not result in any system issues. The PSU mismatch check may prioritize the higher capacity PSU and a valid PSU configuration would include the 1100 W PSU and not the 495 W PSU. In another example, the system may have multiple 495 W PSUs and one 1100 W PSUs. Because there are multiple 495 W PSUs, the PSU mismatch check may determine that the 495 W PSU is the preferred PSU and a valid PSU configuration would include all 495 W PSUs and not the 1110 W PSU.

Following the performance of the PSU mismatch check, the controller 214 may send an indication to the programmable logic device 218 that the PSU mismatch check has been completed, as well as the results of the PSU mismatch check. For example, after completing the PSU mismatch check, the controller 214 may reference the PSU management table 400 and write the mismatch check complete bit 404 to logically true in order to indicate to the programmable logic device 218 that the PSU mismatch check has been completed. The controller 214 may also reference row 412 of the PSU management table 400 and store the results of the PSU mismatch check in row 412 by setting bits for each PSU slot to logically true or false depending on whether the PSU in each of those PSU slots was found to belong to a valid PSU configuration (e.g., an indication that the PSU slot does not have a PSU, or that the PSU in that PSU slot results in a mismatch), respectively.

In an embodiment, from the time when the PSU is enabled to provide power to the main power rail to the time the programmable logic device 218 receives the indication that the PSU mismatch check has completed, the programmable logic device 218 may monitor the computing device 200 to determine whether the output power from the PSU enabled at block 304 still meets the threshold and, if not, return the method 300 to block 304. Furthermore, the programmable logic device 218 may also determine during that time whether the PSU mismatch check meets a timeout condition. For example, if the programmable logic device 218 does not receive the indication that the PSU mismatch check has completed after a period of time following the initial enablement of power to the main power rail, then the programmable logic device 218 will determine that the PSU mismatch has met the timeout condition and, in response, enable power from all of the PSU's 212a-212n in the PSU slots 206a-206n to the main power rail 208 in order to provide power to the controller 214. As such, if the PSU mismatch check complete bit 404 is not set after some period of time, the main power rail 208 may be enabled via each of the PSUs 212a-n in the system.

The method 300 then proceeds to decision block 314 where the enabled PSU slot is determined to be coupled to a PSU that belongs to a valid configuration of PSUs. In an embodiment, at block 314 the programmable logic device 218 may determine whether the PSU 212a coupled to PSU slot 206a belongs to a valid PSU configuration from the results of the PSU mismatch check performed by the controller 214. For example, the programmable logic device 218 may reference the PSU management table 400 at row 412 to determine whether the bit for PSU slot(1) is set to a logically true or false value indicating whether the PSU belongs to a valid PSU configuration or not. If at decision block 314 the programmable logic device 218 determines that the PSU 212a coupled to the PSU slot 206a belongs to a valid PSU configuration, then the method 300 proceeds to block 316, where all of the PSU slots coupled to PSUs belonging to the valid PSU configuration, as determined by the PSU mismatch check, are enabled. In an embodiment, at block 316 the programmable logic device 218 may determine all of the PSUs belonging to the valid PSU configuration from the results of the PSU mismatch check received in the indication from the controller 214. For example, the programmable logic device 218 may reference row 412 of the PSU management table 400 to determine which bit or bits have been set to logically true to indicate a PSU of the valid PSU configuration coupled with its respective PSU slot. In an specific example, the programmable logic device 218 may copy a bit mask of row 412 and write that bit mask to row 408 of the PSU management 400 table in order to enable power from the PSUs in the identified PSU slots to the main power rail 208.

If at decision block 314 the programmable logic device 218 determines that the PSU 212a coupled to the PSU slot 206a is not part of the valid PSU configuration, then the method 300 proceeds to block 318, where the PSU slot coupled to the PSU that is transmitting power to the main power rail is disabled. In an embodiment, at block 318, the programmable logic device 218 may disable the PSU slot 206a, thereby ending transmission of power from the PSU 212a to the main power rail 208. For example, the programmable logic device 218 may set the bit for PSU slot(1) at row 408 of the PSU management table 400 to a logically false value in order to disable power from the PSU 212a to the main power rail 208 through the PSU slot 206a. Following block 318, the method 300 then proceeds to block 316 where all of the PSU slots coupled to PSUs determined as being a part of the valid PSU configuration (as determined by the PSU mismatch check) are enabled. In an embodiment, following block 316, the programmable logic device 218 may delay proceeding to block 316 for a period of time in order to, for example, drain capacitance stored on the main power rail (e.g., 10 sec, 15 sec, or any amount of time necessary to drain capacitance from a main power rail). One of skill in the art in possession of the present disclosure will recognize that by disabling the that disabling PSU slot 206a when coupled to a PSU not belonging to a valid PSU configuration before enabling the PSU slots coupled to PSUs belonging to the valid PSU configuration, prevents incompatible/mismatched PSUs from ever being enabled at the same time.

The method 300 then proceeds to block 320, where control of the PSU slots is passed to the controller. In an embodiment, at block 320 the programmable logic device 218 may pass control of the PSU slots 206a-206n to the controller 214, and the controller 214 may continue to monitor the functionality of the PSU slots 206a-206n that were enabled at block 316 to determine whether or not the PSU slots 206a-206n are transmitting power from their respective PSUs to the main power rail 208 that meets the threshold. For example, the programmable logic device 218 may allow the controller 214 to edit any of the bits in the PSU management table 400 stored in the shared memory 222 as discussed above.

Thus, systems and methods have been described that provide for a PSU mismatch detection system that prevents mismatched/incompatible PSU from providing power to a main power rail at the same time. Such benefits are provided by providing initial control of PSUs/PSU slots to a programmable logic device that is separate from a controller that performs a PSU mismatch check and that is coupled to the auxiliary power rail. The programmable logic device may enable a single PSU to transmit power to the main power rail to power on the system while the controller performs the PSU mismatch check. If the PSU mismatch check determines that the enabled PSU is incompatible with a valid PSU configuration, then the programmable logic device may disable the enabled PSU providing power to the main power rail, and enable all PSUs belonging to the valid PSU configuration, thereby preventing any incompatible PSUs being enabled at the same time. The PSU mismatch detection system of the present disclosure may also allow for removal of auxiliary power rail circuitry for the controller, which frees up space for other control circuitry and/or provides for relatively smaller controllers and computing devices.

Figure 5:
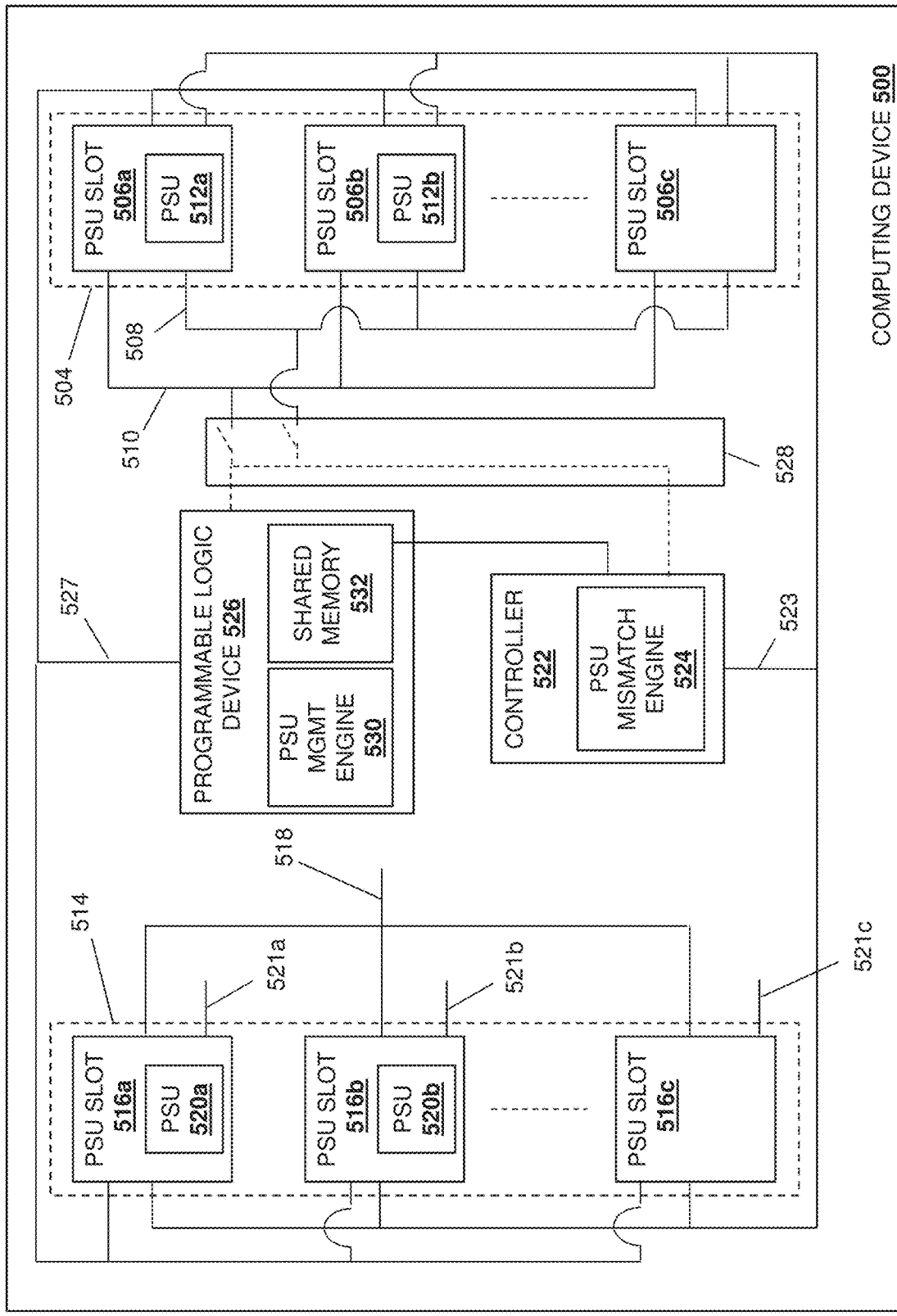
FIG. 5 is a schematic view illustrating an embodiment of a computing device provided the Power Supply Unit (PSU) mismatch detection system of the present disclosure on multiple power rails.

Referring now to FIG. 5, an embodiment of a computing device 500 that includes the Power Supply Unit (PSU) mismatch detection system of the present disclosure is illustrated. In an embodiment, the computing device 500 may be provided by the IHS 100 discussed above with reference to FIG. 1, and/or may include some or all of the components of the IHS 100. In specific embodiments discussed below, the computing device 500 is described as a server, although other computing devices such as desktop computing devices, laptop/notebook computing devices, tablet computing devices, mobile phones, networking devices (e.g., switches, router, etc.), storage systems, and/or other computing devices known in the art may benefit from the teachings of the present disclosure and thus are envisioned as falling within its scope. In the illustrated embodiment, the computing device 500 includes a chassis 502 that houses the components of the computing device 500, only some of which are illustrated in FIG. 5. Furthermore, while the components of the computing device 500 are illustrated as housed in a single chassis, the computing device 500 may be distributed across multiple chassis while remaining within the scope of the present disclosure.

In the illustrated embodiment, the chassis 502 houses a first power system 504 that includes a plurality of power supply unit (PSU) slots 506a, 506b, and up to 506c. While not illustrated, one of skill in the art in possession of the present disclosure will recognize that the first power system 504 may include power connectors, power adapters, and/or other power system components while remaining within the scope of the present disclosure. Each of the plurality of PSU slots 506a-506c is configured to receive power from a power source (not illustrated), is coupled to a main first power rail 508 and an auxiliary first power rail 510, each of which may be coupled to system components (not illustrated). Furthermore, each of the plurality of PSU slots 506a-506c is configured to couple to a respective power supply unit (PSU), with each of the PSUs configured to transmit power received from the power source to the main first power rail 508 and the auxiliary first power rail 210. For example, in the illustrated embodiment, a PSU 512a is positioned in the PSU slot 506a and coupled to each of the main first power rail 508 and the auxiliary first power rail 510, a PSU 512b is positioned in the PSU slot 506b and coupled to each of the main first power rail 508 and the auxiliary first power rail 510, while no PSU is positioned in the PUS slot 506c. One of skill in the art in possession of the present disclosure will recognize that, in some embodiments, the auxiliary first power rail 510 may be omitted.

In the illustrated embodiment, the chassis 502 also houses a second power system 514 that includes a plurality of power supply unit (PSU) slots 516a, 516b, and up to 516c. While not illustrated, one of skill in the art in possession of the present disclosure will recognize that the second power system 514 may include power connectors, power adapters, and/or other power system components while remaining within the scope of the present disclosure. Each of the plurality of PSU slots 516a-516c is configured to receive power from a power source (not illustrated), and is coupled to a main second power rail 518 that may further be coupled to system components (not illustrated). In the illustrated embodiment, each of the PSU slots 516a, 516b, and 516c includes a respective auxiliary power rail coupling 521a, 521b, and 521c that, in the examples below, is not used (but which may be coupled to an auxiliary second power rail in other embodiments). Furthermore, each of the plurality of PSU slots 516a-516c is configured to couple to a respective power supply unit (PSU), with each of the PSUs configured to transmit power received from the power source to the main second power rail 518. For example, in the illustrated embodiment, a PSU 520a is positioned in the PSU slot 516a and coupled to the main second power rail 518, a PSU 520b is positioned in the PSU slot 516b and coupled to the main second power rail 518, while no PSU is positioned in the PUS slot 516c.

In a specific embodiment, the first power system 504 in the computing device 500 may be configured to distribute approximately 12 volts via 12 volt PSUs (e.g., PSU 512a, PSU 512b, etc.) positioned in the PSU slots 506a-c and coupled to a 12 volt main first power rail 508, while the second power system 514 in the computing device 500 may be configured to distribute 48 volts via 48 volt PSUs (e.g., PSU 520a, PSU 520b, etc.) positioned in the PSU slots 516a-c and coupled to a 48 volt main second power rail 518. For example, in such an embodiment the 12 volt power system may be used to power conventional 12 volt server device components such as a Central Processing Unit (CPU), memory, etc., while the 48 volt power system may be used to power a Graphics Processing Unit (GPU), graphics accelerator, etc. However, while a specific example of a two power system computing device utilizing different power level PSUs/power rails is illustrated and described below, one of skill in the art in possession of the present disclosure will recognize that other computing device configurations with more than two power systems, different numbers of PSU slots coupled with PSUs and providing different power levels, and/or other power system characteristics may benefit from the present disclosure and thus fall within its scope as well.

The chassis 502 also houses a controller 522 that is coupled to the main first power rail 508 and the auxiliary first power rail 510 via a power rail switch device 528 that is configured to switch which of the main first power rail 508 and the auxiliary first power rail 510 provide power to the controller 522. Furthermore, the controller 522 is also coupled to each of the plurality of PSU slots 506a-506c and each of the PSU slots 516a-516c via a digital interface 523. In some embodiments, the controller 522 may be coupled to the auxiliary first power rail 510 and configured such that it is initially powered via the auxiliary first power rail 510, and then but switches over to the main first power rail 508 once the main first power rail 508 is activated. In an embodiment, the controller 522 may include a Baseboard Management Controller (BMC), an integrated DELL® Remote Access Controller (iDRAC), and/or other service processors known in the art. For example, the controller 522 may include a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the controller 522 to provide a PSU mismatch engine 524 that is configured to perform the functions of the PSU mismatch engines and controllers discussed below.

The chassis 502 also houses a programmable logic device 526 that is coupled to the main first power rail 508 and the auxiliary first power rail 510 via the power rail switch device 528 that is configured to switch which of the main first power rail 508 and the auxiliary first power rail 510 provide power to the programmable logic device 526. Furthermore, the programmable logic device 526 is also coupled to each of the PSU slots 506a-506c and to each of the PSU slots 516a-516c via an analog interface 527. In some embodiments, the programmable logic device 526 may include a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the programmable logic device 526 to provide a PSU management engine 530 that is configured to perform the functions of the PSU management engines and programmable logic devices discussed below. In other embodiments, the programmable logic device 526 may include a Complex Programmable Logic Device (CPLD) that is configured to cause the programmable logic device 526 to provide the PSU management engine 220. In the illustrated example, the programmable logic device 526 may include a shared memory 532 that, as discussed below, may be shared between the programmable logic device 526 and the controller 522. However, the shared memory 532 may be separate from the programmable logic device 526 (e.g., included in the controller 522, provided by a stand-alone memory device accessible by each of the programmable logic device 526 and the controller 522, etc.).

In other, non-illustrated embodiment, an intermediate power rail may be connected to each of that the controller 522 and the programmable logic device 526. In such embodiments, the intermediate power rail may initially be connected to the auxiliary first power rail 510, and then may be switched to the main first power rail 508 after the main first power rail 508 has "come up", initializes, or otherwise becomes available. In such embodiments, in the event that the main first power rail 508 "goes down" or otherwise becomes unavailable, the intermediate power rail may switch back to the auxiliary first power rail 510. In a specific example, in power state S5 (e.g., an x86 server off state) the intermediate power rail is connected to auxiliary first power rail 210, and in power state S0 (e.g., an x86 server on state) the intermediate power raile is connected to main first power rail 58 (i.e., power states S5 and S0 are system power states defined by ACPI standard). While specific components of the computing device 500 have been illustrated and described, one of skill in the art in possession of the present disclosure will recognize that a variety of other components may be provided in the computing device 500 to perform conventional computing device functions, as well as the functionality discussed below, while remaining within the scope of the present disclosure.

Figure 6:
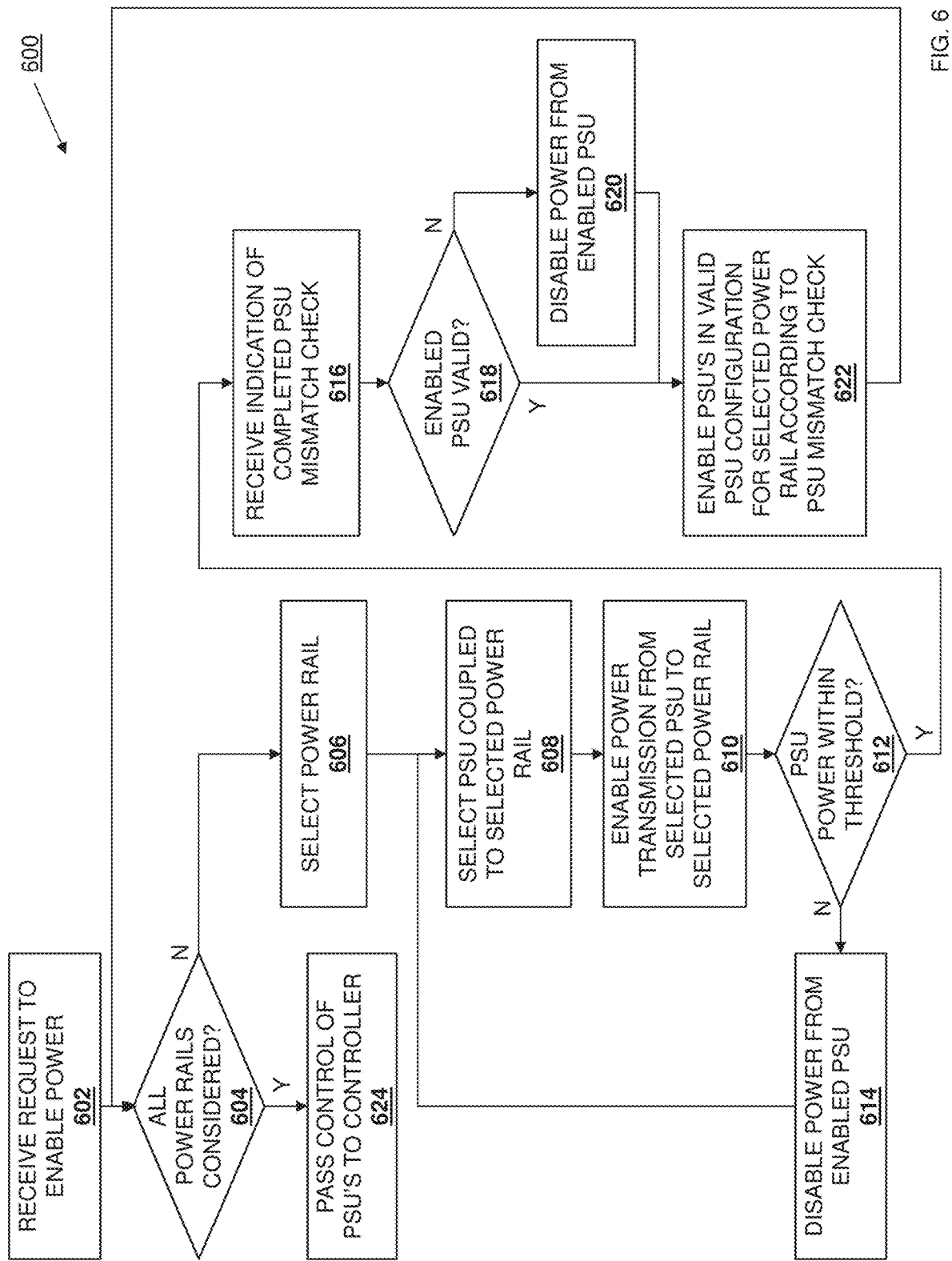
FIG. 6 is a flow diagram illustrating an embodiment of a method for providing PSU mismatch detection for the computing device of FIG. 5.

Referring now to FIG. 6, an embodiment of a method 600 of preventing PSU mismatch is illustrated. As discussed below, a programmable logic device may manage PSUs that are coupled to a main first power rail (e.g., via respective PSU slots) and that may provide power to the main first power rail of a computing device when enabled, as well as manage PSUs that are coupled to a main second power rail (e.g., via respective PSU slots) and that may provide power to the main second power rail of that computing device when enabled. The programmable logic device may, before a controller has been booted and completed a PSU mismatch check, enable a single PSU that is included in the first power system and that is coupled to the main first power rail in order to allow that PSU to provide power to the main first power rail, thus powering the controller that performs the PSU mismatch check for all of the PSUs included in the first power system and coupled to the main first power rail. Upon completion of the PSU mismatch check for the PSUs included in the first power system, the controller may report to the programmable logic device all of the PSUs that are included in the first power system, coupled to the main first power rail, and that belong to a valid PSU configuration for the first power system. If the PSU that is included in the first power system and currently enabled to allow the controller to perform the PSU mismatch check is a PSU that is incompatible with the valid PSU configuration for the first power system according to the PSU mismatch check, the programmable logic device may disable that PSU from providing power to the main first power rail (which will not result in a data loss when the system is performing a Power-On Self-Test (POST)). If that PSU is a PSU that is compatible with the valid PSU configuration for the first power system according to the PSU mismatch check, power from that PSU to the main first power rail may be maintained. The programmable logic device may then enable all of the PSUs that are included in the first power system and that belong to the valid PSU configuration for the first power system according to the PSU mismatch check to provide power to the main first power rail.

Concurrent with, or subsequent to, enabling the valid PSU configuration in the first power system, the programmable logic device may also enable a single PSU that is included in the second power system and that is coupled to the main second power rail in order to allow that PSU to provide power to the main second power rail, and the controller may perform the PSU mismatch check for all of the PSUs included in the second power system and coupled to the main second power rail. Upon completion of the PSU mismatch check for the PSUs included in the second power system, the controller may report to the programmable logic device all of the PSUs that are included in the second power system, coupled to the main second power rail, and that belong to a valid PSU configuration for the second power system. If the PSU that is included in the second power system and currently enabled to allow the controller to perform the PSU mismatch check is a PSU that is incompatible with the valid PSU configuration for the second power system according to the PSU mismatch check, the programmable logic device may disable that PSU from providing power to the main second power rail (which will not result in a data loss when the system is performing a Power-On Self-Test (POST).) If that PSU is a PSU that is compatible with the valid PSU configuration for the second power system according to the PSU mismatch check, power from that PSU to the main second power rail may be maintained. The programmable logic device may then enable all of the PSUs that are included in the second power system and that belong to the valid PSU configuration for the second power system according to the PSU mismatch check to provide power to the main second power rail. The method 500 prevents PSUs that are mismatched and/or incompatible with each other or the system from being enabled to provide power to the main first power rail or the main second power rail at the same time, which may prevent errors, damage to the computing device, and other issues that result from mismatched power supplies. The systems and methods of the present disclosure may also free the system from requiring auxiliary power rail circuitry for the controller that takes up valuable space in the computing device.

The method 600 begins at block 602 where a request to enable power is received. In an embodiment, at block 602, the programmable logic device 526 may receive a request to enable power for the computing device 500. In some examples, the auxiliary power rail 510 may be enabled such that it is provided power to the programmable logic device 526 prior to the programmable logic device 526 receiving the request to enable power to the computing device 500 at block 602. As such, the programmable logic device 526 may be powered on, started up, initialized, and/or otherwise enabled via power from the auxiliary power rail 510, and may in turn initialize PSU slot management bits in the shared memory 532 such that all values stored in the shared memory 532 are set to logically false.

Figure 7:
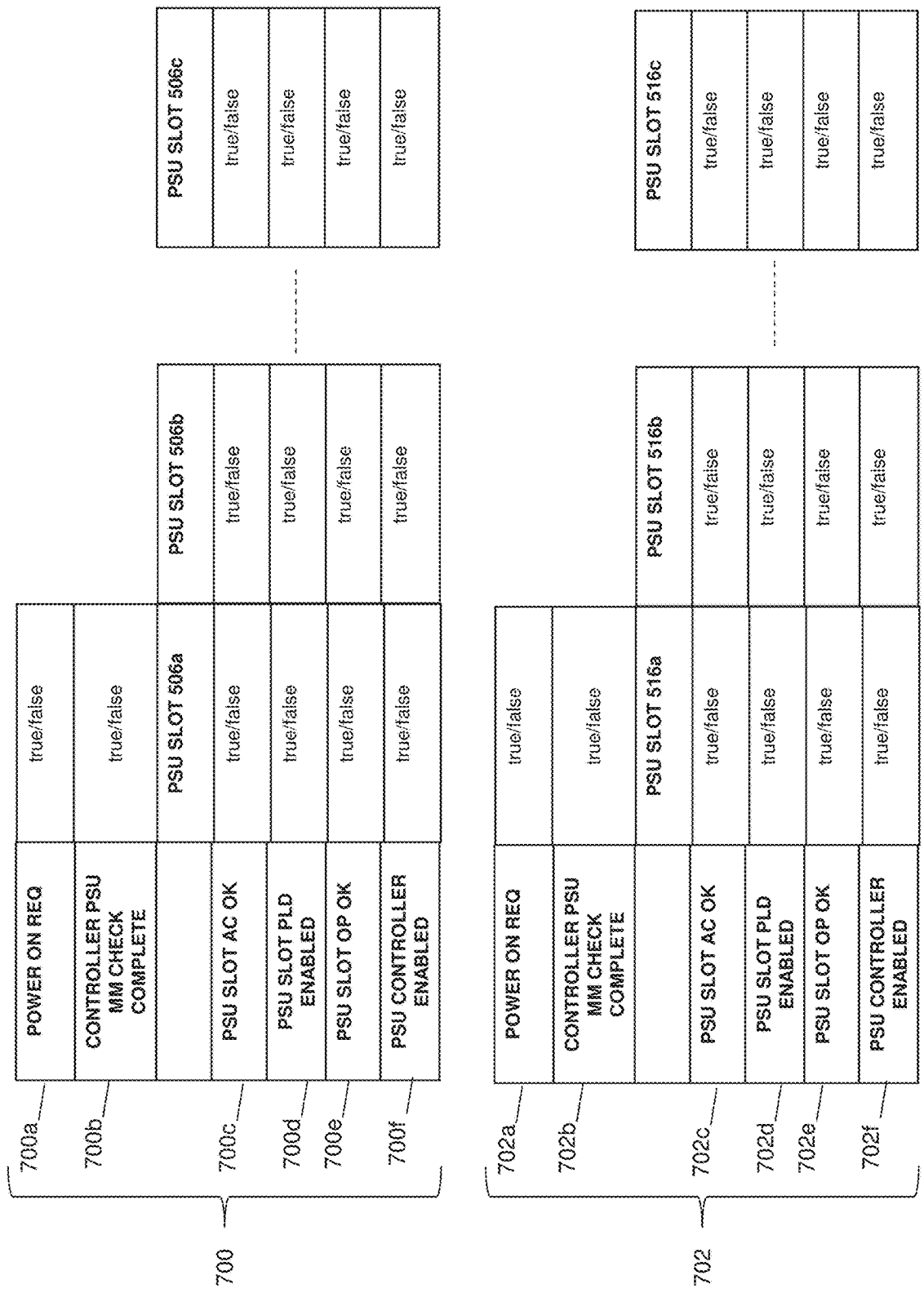
FIG. 7 is a table illustrating an embodiment of data structures for PSU management that may be stored in a memory of the computing system of FIG. 5

FIG. 7 illustrates an embodiment of PSU slot management tables 700 and 702, which represent the bits stored in the shared memory 532 (e.g., registers), and/or hardware signals received from PSUs via combinational logic provided by the programmable logic device 526. In the illustrated example, the PSU slot management tables 700 and 702 represent respective power-on request bits 700a and 702a that may provide an indication to the programmable logic device 526 to enable power to the main first power rail 508 and the main second power rail 518 when the respective power-on request bits 700a and 702a are set to logically true. The PSU slot management tables 700 and 702 also represent respective mismatch check complete bits 700b and 702b which, when set to logically true, may provide an indication to the programmable logic device 526 that a PSU mismatch check has been completed by the controller 522. The PSU slot management tables 700 and 702 also represent a bit for each PSU slot that indicates whether the PSU slot has input power, and one of skill in the art in possession of the present disclosure will recognize that the presence of input power may indicate whether the PSU slot is coupled to a PSU. For example, row 700c in the PSU slot management table 700 is labeled "PSU Slot AC OK", and represents each bit that indicates whether PSU slot 506a, PSU slot 506b, and PSU slot 506c have input power (i.e., those slots may have input power when their respective bits are set to logically true.) Similarly, row 702c in the PSU slot management table 702 is labeled "PSU Slot AC OK", and represents each bit that indicates whether PSU slot 516a, PSU slot 516b, and PSU slot 516c have input power (i.e., those slots may have input power when their respective bits are set to logically true.)

The PSU slot management tables 700 and 702 also represent bits that may cause hardware logic provided by the programmable logic device 526 to enable each PSU slot coupled to a PSU to provide power to the main first power rail 508 and the main second power rail 518. For example, row 700d of the PSU management table 700 may provide an indication of whether the programmable logic device 526 has enabled PSU slot 506a, PSU slot 506b, and PSU slot 506c (e.g., if a bit is set to logically true in row 700d, the respective PSU slot may be enabled to provide power to the main first power rail 508.) Similarly, row 702d of the PSU management table 702 may provide an indication of whether the programmable logic device 526 has enabled PSU slot 516a, PSU slot 516b, and PSU slot 516c (e.g., if a bit is set to logically true in row 702d, the respective PSU slot may be enabled to provide power to the main second power rail 508.)

The PSU slot management tables 700 and 702 may also represent a hardware signal for each PSU slot that indicates whether the PSU slot output power meets a threshold. For example, PSUs with a 12V power output (e.g., to the main first power rail 508) may have a threshold of +/−8%, which corresponds to a valid power output range of 11.04V to 12.96V. similarly, PSUs with a 48V power output (e.g., to the main second power rail 518) may have a threshold of +/−8%, which corresponds to a valid power output range of 44.16V to 51.84V. However, while specific thresholds have been provided as an example, one of skill in the art in possession of the present disclosure will recognize that tolerances and/or other thresholds may be different than the +/−8% discussed above (e.g., the tolerance/threshold for a 12 volt PSU may be tighter because those PSUs feed directly to PCIe adapters, storage devices, and fans that dictate the tolerance/threshold, while the tolerance for a 48 volt PSU may be more relaxed because those PSUs may be connected to a voltage regulator). As would be understood by one of skill in the art in possession of the present disclosure, PSUs may be configured to monitor their own power output, and assert a logically true or false signal depending on whether the output power is within the valid power output range. For example, row 700e of the PSU management table 700 may provide an indication of whether PSU slot 506a, PSU slot 506b, and PSU slot 506c have output power that meets the threshold (e.g., that output power meets the threshold when the respective bits are set to logically true.) Similarly, row 702e of the PSU management table 702 may provide an indication of whether PSU slot 516a, PSU slot 516b, and PSU slot 516c have output power that meets the threshold (e.g., that output power meets the threshold when the respective bits are set to logically true.)

The PSU slot management tables 700 and 702 also represent a bit for each PSU slot in which the controller 522 may store a logically true or false value in order to indicate whether a respective PSU slot is coupled to a PSU that is included in a valid PSU configuration according to a PSU mismatch check. For example, row 700f of the PSU management table 700 indicates whether the PSU slot 506a, PSU slot 506b, and PSU slot 506c are coupled to PSUs included in a valid PSU configuration by storing a logically true bit (i.e., associated with a PSU that is included in a valid PSU configuration) or a logically false bit (i.e., associated with a PSU that is not included in a valid PSU configuration) for each PSU slot. Similarly, row 702f of the PSU management table 702 indicates whether the PSU slot 516a, PSU slot 516b, and PSU slot 516c are coupled to PSUs included in a valid PSU configuration by storing a logically true bit (i.e., associated with a PSU that is included in a valid PSU configuration) or a logically false bit (i.e., associated with a PSU that is not included in a valid PSU configuration) for each PSU slot.

After the PSU slot management tables 700 and 702, which represent the bits in shared memory 222 and hardware signals received from PSUs as discussed above, has been initialized by the programmable logic device 526 to logically false values, the programmable logic device 526 may monitor the computing device 500 until the request to enable power to the main first power rail 508 and the main second power rail 518 is received at block 602. For example, the programmable logic device 526 may monitor the power via the power-on request bits 700a and 702a represented by the PSU management tables 700 and 702 in the shared memory 532 until the power-on request bit 700a and 702a are set to a logically true value that provides an indication of the request to enable power. In a specific example, the controller 522 may set the power-on request bits 700a and 702a to a logically true value if the controller 522 had previously booted, started up, or was initialized using auxiliary power, based on the monitoring of hardware signals (e.g., a hardware signal from the front panel power button), and/or in response to a variety of other power-on scenarios that would be apparent to one of skill in the art in possession of the present disclosure. In another example, a Peripheral Control Hub (PCH) may be configured to automatically request a power-on whenever power is available, and assert a hardware signal to the programmable logic device 522 that causes the power-on request bits 700a and 702a to be set to logically true values.

The method 600 then proceeds to decision block 604 where it is determined whether all main power rails have been considered. In an embodiment, at decision block 604, the programmable logic device 526 may determine whether valid PSU configurations have been determined for all main power rails available (or to-be enabled) in the computing device 500 (e.g., the main first power rail 508 and the main second power rail 518). As discussed below, the programmable logic device 526 may operate with the controller 522 to enable valid PSU configurations of PSUs for any or all of the main power rails available in the computing device 500, and one of skill in the art in possession of the present disclosure will recognize that decision block 604 provide for the determination, during each iteration of the method 600, of whether each of those main power rails have had valid PSU configurations enabled via the method 600. However, while the decision block 604 indicates that main power rails are enabled sequentially, concurrent enablement of main power rails according to the teachings of the present disclosure will fall within the scope of the present disclosure as well. If, at decision block 604, it is determined that all the main power rails in the computing device 500 have not been considered, the method 600 proceeds to block 606 where a main power rail is selected. For example, the example provided below describes a first iteration of the method 600 in which the programmable logic device 526 selects the main first power rail 508, followed by a second iteration of the method 600 in which the programmable logic device 526 may select the main second power rail 518, and one of skill in the art in possession of the present disclosure will recognize how any number of power rails may have valid PSU configurations enabled in a similar manner while remaining within the scope of the present disclosure.

The method 600 then proceeds to block 608 where a PSU is selected that is coupled to the power rail selected at block 606 (i.e., the main first power rail 508 in this example). In an embodiment, at block 608, the programmable logic device 526 may determine that a PSU is coupled to one of the PSU slots 506a-506c that are coupled to the main first power rail 508. For example, the programmable logic device 526 may sequentially check each PSU slot 506a-506c for a PSU until the programmable logic device 526 determines that a PSU Is coupled to at least one of the PSU slots 506a-506c that are coupled to the main first power rail 508. As such, the programmable logic device 526 may check the PSU slot 506a, determine that the PSU 512a is coupled to the PSU slot 506a, and then enable the PSU 512a as described further below. If a PSU slot is not coupled to a PSU (e.g., the PSU slot 506c), then the programmable logic device 526 may proceed to check the next PSU slot until the programmable logic device 526 finds a PSU slot that is coupled with a PSU that can provide power to the main first power rail 508.

In an embodiment, at block 608, the programmable logic device 526 may determine whether any of the plurality of PSU slots 506a-506c coupled to the selected main first power rail 508 have input power enabled. For example, the programmable logic device 526 may check a bit in row 700c of the PSU management table 700 for PSU slot 506a, and if the programmable logic device 526 reads a logically true value, then the programmable logic device 526 may determine that the PSU slot 506a has input power, which indicates that a PSU is coupled to the PSU slot 506a. If the programmable logic device 526 reads a logically false value for PSU slot 506a in row 700c, the programmable logic device 526 may increment a PSU slot count, and then check the bit stored in row 700c for PSU slot 506b for a logically true or false value, and so on until the programmable logic device 526 reads a logically true value that indicates a PSU is coupled to one of the plurality of PSU slots 506a-506c.

The method 600 then proceeds to block 610 where transmission of power is enabled from the PSU selected at block 608 to the main power rail selected at block 606. In an embodiment, at block 610 and in response to selecting the PSU coupled to the main first power rail 508 at block 608 (e.g., the PSU 512a coupled to the PSU slot 506a in this example), the programmable logic device 526 then enables the transmission of power to the main first power rail 508 from PSU 512a. For example, the programmable logic device 526 may set the bit for the PSU slot 506a in row 700d of the PSU management table 700 to a logically true value, which has the effect of "turning on" the PSU slot 506a to enable power from the PSU 512a to the main first power rail 508.

The method 600 then proceeds to decision block 612 where it is determined whether the power provided by the enabled PSU to the selected power rail meets a threshold. In an embodiment, at decision block 612, the programmable logic device 526 determines whether the power being transmitted to the main first power rail 508 from the PSU 512a meets a threshold. For example, as discussed above, PSUs with a 12V main power output may have a threshold of +/−8%, which corresponds to a valid power output range of 11.04V to 12.96V, and the PSUs may monitor their own power output and asserts a logically true or false signal depending on whether the output power is within the valid power output range. As such, the programmable logic device 526 may reference the PSU management table 700 at row 700e (e.g., via hardware signals received from the PSU 512a) and determine whether the bit for the PSU slot 506a is set to a logically true or false value. If the bit for PSU slot 506a is set to logically false, then the programmable logic device 526 may determine that power provided by the PSU 512a via the PSU slot 506a to the main first power rail 508 does not meet the threshold. However, if the bit for PSU slot 506a is set to logically true, then the programmable logic device 526 may determine that the power provided by the PSU 512a via the PSU slot 506a to the main first power rail 508 meets the threshold.

If at decision block 612 the programmable logic device 526 determines that the power provided by the enabled PSU via its PSU slot to the selected power rail does not meet the threshold, then method 600 proceeds to block 614 where power provided by the enabled PSU to the selected power rail is disabled. In an embodiment of block 614, the programmable logic device 526 may disable power provided by the PSU 512a via the PSU slot 506a to the main first power rail 508. For example, the programmable logic device 526 may reference the PSU management table 700 and set the bit for PSU slot 506a in row 700e to a logically false value, which may provide a disabled state for the PSU slot 506a that prevents the PSU 512a from providing power to the main first power rail 508 through the PSU slot 506a. The method 600 may then return to block 608 to select another PSU coupled to the selected power rail, which may be performed substantially as discussed above.

If at decision block 612, it is determined that the power provided by the enabled PSU to the selected power rail meets the threshold, then the method 600 proceeds to block 616 where an indication is received that a controller has completed a PSU mismatch check. In an embodiment, in response to the transmission of power being enabled at block 610 by the PSU 512a to the main power rail 508 and/or the auxiliary power rail, the controller 522 may initialize and begin performing a variety of actions including, for example, performing a PSU mismatch check using the PSU mismatch engine 524, monitoring temperature, monitor fan speeds, monitor communication parameters, and/or other controller based routines that would be apparent to one of skill in the art in possession of the present disclosure. For example, the PSU mismatch check may operate to determine whether any issues will arise if a combination of the PSUs 512a, 512b, and/or other PSUs provided in the PSU slots 506a-c, provide power to the main first power rail 508 at the same time. Specifically, the PSU mismatch check may compare parameters between the PSUs, as well as between the PSUs and the computing device 500. For example, the controller 522 may determine parameters of the PSUs and computing device 500, and then reference a table stored in memory and/or included in hard coded logic to determine which combinations are valid.

For example, the controller 214 may determine parameters for each PSU coupled to the main first power rail 508 such as PSU models supported by the computing device 500, PSU output power capability, PSU generation, PSU output voltage, PSU hardware and firmware versions, and/or other PSU and system parameters that would be apparent to one of skill in the art in possession of the present disclosure. The PSU mismatch check may also prioritize certain features in determining a valid PSU configuration. For example, if a first PSU slot includes an 1100 W PSU, and a second PSU slot includes a 495 W PSU, the PSU mismatch check may determine the combination of the PSUs enabled together could lead to an unexpected shut down of the computing device due to their power output difference, while each of those PSUs enabled alone would not result in any computing device issues. The PSU mismatch check may provide for the prioritization of the higher capacity PSU and, as such, a valid PSU configuration in such an example would include the 1100 W PSU and not the 495 W PSU. In another example, the computing device 500 may include multiple 495 W PSUs and one 1100 W PSU, and the PSU mismatch check may determine that the 495 W PSUs are the preferred PSU, with a valid PSU configuration including all of the 495 W PSUs, and not the 1110 W PSU.

Following the performance of the PSU mismatch check, the controller 522 may send an indication to the programmable logic device 526 that the PSU mismatch check has been completed, as well as the results of the PSU mismatch check. For example, after completing the PSU mismatch check, the controller 522 may reference the PSU management table 700, and write the mismatch check complete bit 700b to logically true in order to indicate to the programmable logic device 526 that the PSU mismatch check has been completed. The controller 522 may also reference row 700f of the PSU management table 700, and store the results of the PSU mismatch check in row 700f by setting bits for each PSU slot to logically true or false depending on whether the PSU in those PSU slots was included as part of a valid PSU configuration (e.g., an indication that the PSU slot does not have a PSU, an indication that the PSU in that PSU slot results in a mismatch, etc.).

In an embodiment, from the time when a PSU is enabled to provide power to a main power rail, to the time the programmable logic device 526 receives the indication that the PSU mismatch check has been completed, the programmable logic device 526 may monitor the computing device 500 to determine whether the power provided by the PSU enabled at block 610 still meets the threshold and, if not, return the method 600 to block 608. Furthermore, the programmable logic device 526 may also determine during that time whether the PSU mismatch check meets a timeout condition. For example, if the programmable logic device 526 does not receive the indication that the PSU mismatch check has completed after a period of time following the initial enablement of power to the main first power rail 508, then the programmable logic device 526 may determine that the PSU mismatch has met the timeout condition and, in response, enable power from all of the PSU's 512a-512c in the PSU slots 506a-506c to the main power first rail 508 in order to provide power to the controller 522. As such, if the PSU mismatch check complete bit 700b is not set after some period of time, the main power rail 508 may be enabled via each of the PSUs 512a-c in the computing device 500.

The method 600 then proceeds to decision block 618 where it is determined whether the enabled PSU is part of the valid PSU configuration. In an embodiment, at decision block 618, the programmable logic device 526 may determine whether the PSU 512a coupled to PSU slot 506a belongs to a valid PSU configuration based on the results of the PSU mismatch check performed by the controller 522. For example, the programmable logic device 526 may reference the PSU management table 700 at row 700f to determine whether the bit for PSU slot 512a is set to a logically true or false value, which is indicative of whether the PSU 512a belongs to the valid PSU configuration determined according to the PSU mismatch check. If at decision block 618 the programmable logic device 526 determines that the PSU 512a coupled to the PSU slot 506a belongs to a valid PSU configuration, then the method 600 proceeds to block 612, where each of the PSU slots coupled to PSUs belonging to the valid PSU configuration are enabled. In an embodiment, at block 622 the programmable logic device 526 may identify all of the PSUs belonging to the valid PSU configuration from the results of the PSU mismatch check received in the indication from the controller 522. For example, the programmable logic device 526 may reference row 700f of the PSU management table 700 to determine which bit or bits have been set to logically true to indicate a PSU in the valid PSU configuration that is coupled with its respective PSU slot. In an specific example, the programmable logic device 526 may copy a bit mask of row 700f, and write that bit mask to row 700d of the PSU management table 700 in order to enable power from the PSUs in the identified PSU slots to the main first power rail 508 according to the valid PSU configuration.

If at decision block 618 the programmable logic device 526 determines that the PSU 512*a* coupled to the PSU slot 506*a* is not part of the valid PSU configuration, then the method 600 proceeds to block 620 where the PSU slot coupled to the PSU that was enabled at block 610 and that is transmitting power to the main first power rail 508 is disabled. In an embodiment, at block 620, the programmable logic device 526 may disable the PSU slot 506*a*, thereby preventing the transmission of power from the PSU 512*a* to the main first power rail 508. For example, the programmable logic device 526 may set the bit for PSU slot 506*a* at row 700*d* in the PSU management table 700 to a logically false value in order to disable the provisioning of power from the PSU 512*a* to the main first power rail 508 through the PSU slot 506*a*. Following block 620, the method 600 then proceeds to block 622 where all of the PSU slots coupled to PSUs determined as being a part of the valid PSU configuration (as determined by the PSU mismatch check) are enabled. In an embodiment, following block 620, the programmable logic device 526 may delay proceeding to block 622 for a period of time in order to, for example, drain capacitance stored on the main first power rail 508 (e.g., 10 sec, 15 sec, or any amount of time necessary to drain capacitance from a power rail). One of skill in the art in possession of the present disclosure will recognize that disabling the PSU slot 506*a* coupled to the PSU 512*a* that is not included in the valid PSU configuration before enabling the PSU slots coupled to PSUs belonging to the valid PSU configuration, prevents incompatible/mismatched PSUs from ever being enabled at the same time.

The method 600 then returns to decision block 604 to determine again whether all the main power rails have been considered. If, at decision block 604, it is determined that all the main power rails in the computing device 500 have not been considered, the method 600 proceeds to block 606 where a main power rail is selected. Continuing with the example provided above, at block 608 the programmable logic device 526 may select the main second power rail 518 during the second iteration of the method 600.

The method 600 then proceeds to block 608 where a PSU is selected that is coupled to the power rail selected at block 606 (i.e., the main second power rail 518 in this example). In an embodiment, at block 608, the programmable logic device 526 may determine that a PSU is coupled to one of the PSU slots 516*a*-516*c* that are coupled to the main second power rail 518. For example, the programmable logic device 526 may sequentially check each PSU slot 516*a*-516*c* for a PSU until the programmable logic device 526 determines that a PSU is coupled to at least one of the PSU slots 516*a*-516*c* that are coupled to the main second power rail 518. As such, the programmable logic device 526 may check the PSU slot 516*a*, determine that the PSU 520*a* is coupled to the PSU slot 516*a*, and then enable the PSU 520*a* as described further below. If a PSU slot is not coupled to a PSU (e.g., the PSU slot 516*c*), then the programmable logic device 526 may proceed to check the next PSU slot until the programmable logic device 526 finds a PSU slot that is coupled with a PSU that can provide power to the main second power rail 518.

In an embodiment, at block 608, the programmable logic device 526 may determine whether any of the plurality of PSU slots 516*a*-516*c* coupled to the selected main power rail have input power enabled. For example, the programmable logic device 526 may check a bit in row 702*c* of the PSU management table 702 for PSU slot 516*a*, and if the programmable logic device 526 reads a logically true value, then the programmable logic device 526 may determine that the PSU slot 516*a* has input power, which indicates that a PSU is coupled to the PSU slot 516*a*. If the programmable logic device 526 reads a logically false value for PSU slot 516*a* in row 702*c*, the programmable logic device 526 may increment a PSU slot count, and then check the bit stored in row 702*c* for PSU slot 516*b* for a logically true or false value, and so on until the programmable logic device 526 reads a logically true value that indicates a PSU is coupled to one of the plurality of PSU slots 516*a*-516*c*.

The method 600 then proceeds to block 610 where the transmission of power is enabled from the PSU selected at block 608 to the main power rail selected at block 606. In an embodiment, at block 610 and in response to selecting the PSU coupled to the main second power rail 518 at block 608 (e.g., the PSU 520*a* coupled to the PSU slot 516*a* in this example), the programmable logic device 526 then enables the transmission of power to the main second power rail 518 from PSU 520*a*. For example, the programmable logic device 526 may set the bit for the PSU slot 516*a* in row 702*d* of the PSU management table 702 to a logically true value, which has the effect of "turning on" the PSU slot 516*a* to enable power from the PSU 520*a* to the main second power rail 518.

The method 600 then proceeds to decision block 612 where it is determined whether the power provided by the enabled PSU to the selected power rail meets a threshold. In an embodiment, at decision block 612, the programmable logic device 526 determines whether the power being transmitted to the main second power rail 518 from the PSU 520*a* meets a threshold. For example, as discussed above, PSUs with a 48V power output may have a threshold of +/−8%, which corresponds to a valid power output range of 44.16V to 51.84V, and the PSUs may monitor their own power output and asserts a logically true or false signal depending on whether the output power is within the valid power output range. As such, the programmable logic device 526 may reference the PSU management table 702 at row 702*e* (e.g., via hardware signals received from the PSU 520*a*) and determine whether the bit for the PSU slot 516*a* is set to a logically true or false value. If the bit for PSU slot 516*a* is set to logically false, then the programmable logic device 526 may determine that power provided by the PSU 520*a* via the PSU slot 516*a* to the main second power rail 518 does not meet the threshold. However, if the bit for PSU slot 516*a* is set to logically true, then the programmable logic device 526 may determine that the power provided by the PSU 520*a* via the PSU slot 516*a* to the main second power rail 518 meets the threshold.

If at decision block 612 the programmable logic device 526 determines that the power provided by the enabled PSU via its PSU slot to the selected power rail does not meet the threshold, then method 600 proceeds to block 614 where power provided by the enabled PSU to the selected power rail is disabled. In an embodiment of block 614, the programmable logic device 526 may disable power provided by the PSU 520*a* via the PSU slot 516*a* to the main second power rail 518. For example, the programmable logic device 526 may reference the PSU management table 702 and set the bit for PSU slot 516*a* in row 702*e* to a logically false value, which may provide a disabled state for the PSU slot 516*a* that prevents the PSU 520*a* from providing power to the main second power rail 518 through the PSU slot 516*a*. The method 600 may then return to block 608 to select another PSU coupled to the selected power rail, which may be performed substantially as discussed above.

If at decision block 612, it is determined that the power provided by the enabled PSU to the selected power rail meets the threshold, then the method 600 proceeds to block 616 where an indication is received that a controller has completed a PSU mismatch check. In an embodiment, in response to the transmission of power being enabled at block 610 by the PSU 520*a* to the main second power rail 518, the controller 522 may initialize and begin performing a variety of actions including, for example, performing a PSU mismatch check using the PSU mismatch engine 524, monitoring temperature, monitor fan speeds, monitor communication parameters, and/or other controller based routines that would be apparent to one of skill in the art in possession of the present disclosure. For example, the PSU mismatch check may operate to determine whether any issues will arise if a combination of the PSUs 520*a*, 520*b*, and/or other PSUs provided in the PSU slots 516*a*-516*c*, provide power to the main second power rail 518 at the same time. Specifically, the PSU mismatch check may compare parameters between the PSUs, as well as between the PSUs and the computing device 500. For example, the controller 522 may determine parameters of the PSUs and computing device 500, and then reference a table stored in memory and/or included in hard coded logic to determine which combinations are valid.

For example, the controller 522 may determine parameters for each PSU coupled to the main second power rail 518 such as PSU models supported by the computing device 500, PSU output power capability, PSU generation, PSU output voltage, PSU hardware and firmware versions, and/or other PSU and system parameters that would be apparent to one of skill in the art in possession of the present disclosure. The PSU mismatch check may also prioritize certain features in determining a valid PSU configuration. Similarly as discussed above, if a first PSU slot includes an 1100 W PSU, and a second PSU slot includes a 495 W PSU, the PSU mismatch check may determine the combination of the PSUs enabled together could lead to an unexpected shut down of the computing device due to their power output difference, while each of those PSUs enabled alone would not result in any computing device issues. The PSU mismatch check may provide for the prioritization of the higher capacity PSU and, as such, a valid PSU configuration in such an example would include the 1100 W PSU and not the 495 W PSU. In another example, the computing device 500 may include multiple 495 W PSUs and one 1100 W PSU, and the PSU mismatch check may determine that the 495 W PSUs are the preferred PSU, with a valid PSU configuration including all of the 495 W PSUs, and not the 1110 W PSU.

Following the performance of the PSU mismatch check, the controller 522 may send an indication to the programmable logic device 526 that the PSU mismatch check has been completed, as well as the results of the PSU mismatch check. For example, after completing the PSU mismatch check, the controller 522 may reference the PSU management table 702, and write the mismatch check complete bit 702*b* to logically true in order to indicate to the programmable logic device 526 that the PSU mismatch check has been completed. The controller 522 may also reference row 702*f* of the PSU management table 702, and store the results of the PSU mismatch check in row 702*f* by setting bits for each PSU slot to logically true or false depending on whether the PSU in those PSU slots was included as part of a valid PSU configuration (e.g., an indication that the PSU slot does not have a PSU, an indication that the PSU in that PSU slot results in a mismatch, etc.).

In an embodiment, from the time when a PSU is enabled to provide power to a main power rail, to the time the programmable logic device 526 receives the indication that the PSU mismatch check has been completed, the programmable logic device 526 may monitor the computing device 500 to determine whether the power provided by the PSU enabled at block 610 still meets the threshold and, if not, return the method 600 to block 608. Furthermore, the programmable logic device 526 may also determine during that time whether the PSU mismatch check meets a timeout condition. For example, if the programmable logic device 526 does not receive the indication that the PSU mismatch check has completed after a period of time following the initial enablement of power to the main second power rail 518, then the programmable logic device 526 may determine that the PSU mismatch has met the timeout condition and, in response, enable power from all of the PSU's 520*a*-520*c* in the PSU slots 516*a*-516*c* to the main second power rail 518 in order to provide power to the controller 522. As such, if the PSU mismatch check complete bit 702*b* is not set after some period of time, the main second power rail 518 may be enabled via each of the PSUs 520*a*-520*c* in the computing device 500.

The method 600 then proceeds to decision block 618 where it is determined whether the enabled PSU is part of the valid PSU configuration. In an embodiment, at decision block 618, the programmable logic device 526 may determine whether the PSU 520*a* coupled to PSU slot 516*a* belongs to a valid PSU configuration from the results of the PSU mismatch check performed by the controller 522. For example, the programmable logic device 526 may reference the PSU management table 702 at row 702*f* to determine whether the bit for PSU slot 520*a* is set to a logically true or false value, which is indicative of whether the PSU 520*a* belongs to the valid PSU configuration determined according to the PSU mismatch check. If at decision block 618 the programmable logic device 526 determines that the PSU 520*a* coupled to the PSU slot 516*a* belongs to a valid PSU configuration, then the method 600 proceeds to block 612, where each of the PSU slots coupled to PSUs belonging to the valid PSU configuration are enabled. In an embodiment, at block 622 the programmable logic device 526 may identify all of the PSUs belonging to the valid PSU configuration from the results of the PSU mismatch check received in the indication from the controller 522. For example, the programmable logic device 526 may reference row 702*f* of the PSU management table 702 to determine which bit or bits have been set to logically true to indicate a PSU in the valid PSU configuration that is coupled with its respective PSU slot. In an specific example, the programmable logic device 526 may copy a bit mask of row 702*f*, and write that bit mask to row 702*d* of the PSU management table 702 in order to enable power from the PSUs in the identified PSU slots to the main second power rail 518 according to the valid PSU configuration.

If at decision block 618 the programmable logic device 526 determines that the PSU 520*a* coupled to the PSU slot 516*a* is not part of the valid PSU configuration, then the method 600 proceeds to block 620 where the PSU slot coupled to the PSU that was enabled at block 610 and that is transmitting power to the main second power rail 518 is disabled. In an embodiment, at block 620, the programmable logic device 526 may disable the PSU slot 516*a*, thereby preventing the transmission of power from the PSU 520*a* to the main second power rail 518. For example, the programmable logic device 526 may set the bit for PSU slot 516*a* at row 702*d* in the PSU management table 702 to a logically false value in order to disable the provisioning of power from the PSU 520*a* to the main second power rail 518 through the PSU slot 516*a*. Following block 620, the method

600 then proceeds to block 622 where all of the PSU slots coupled to PSUs determined as being a part of the valid PSU configuration (as determined by the PSU mismatch check) are enabled. In an embodiment, following block 620, the programmable logic device 526 may delay proceeding to block 622 for a period of time in order to, for example, drain capacitance stored on the main second power rail 518 (e.g., 10 sec, 15 sec, or any amount of time necessary to drain capacitance from a power rail). One of skill in the art in possession of the present disclosure will recognize that disabling the PSU slot 516*a* coupled to the PSU 520*a* that is not included in the valid PSU configuration before enabling the PSU slots coupled to PSUs belonging to the valid PSU configuration, prevents incompatible/mismatched PSUs from ever being enabled at the same time When it is determined that all power rails have been considered at decision block 604, the method 600 proceeds to block 624 where control of the PSU slots coupled to each of the power rails is passed to the controller. In an embodiment, at block 624 the programmable logic device 526 may pass control of the PSU slots 506*a*-506*c* to the controller 522, as well as pass control of PSU slots 516*a*-516*c* to the controller 522, and the controller 522 may then continue to monitor the functionality of the PSU slots 506*a*-506*c* that were enabled for the main first power rail 508 according to the method 600, and monitor the PSU slots 516*a*-516*c* that were enabled for the main second power rail 518 according to the method 600, to determine whether or not the PSU slots 506*a*-506*c* are transmitting power from their respective PSUs to the main first power rail 508 that meets the threshold, and whether or not the PSU slots 516*a*-516*c* are transmitting power from their respective PSUs to the main second power rail 518 that meets the threshold. For example, the programmable logic device 526 may allow the controller 522 to edit any of the bits in the PSU management tables 700 and 702 stored in the shared memory 532 as discussed above.

Thus, systems and methods have been described that provide for a PSU mismatch detection system that prevents mismatched/incompatible PSU from providing power to multiple main power rails. A programmable logic device may manage PSUs that are coupled to a main first power rail (e.g., via respective PSU slots) and that may provide power to the main first power rail of a computing device when enabled, as well as manage PSUs that are coupled to a main second power rail (e.g., via respective PSU slots) and that may provide power to the main second power rail of that computing device when enabled. The programmable logic device may, before a controller has been booted and completed a PSU mismatch check, enable a single PSU that is included in the first power system and that is coupled to the main first power rail in order to allow that PSU to provide power to the main first power rail, thus powering the controller that performs the PSU mismatch check for all of the PSUs included in the first power system and coupled to the main first power rail. Upon completion of the PSU mismatch check for the PSUs included in the first power system, the controller may report to the programmable logic device all of the PSUs that are included in the first power system, coupled to the main first power rail, and that belong to a valid PSU configuration for the first power system. If the PSU that is included in the first power system and currently enabled to allow the controller to perform the PSU mismatch check is a PSU that is incompatible with the valid PSU configuration for the first power system according to the PSU mismatch check, the programmable logic device may disable that PSU from providing power to the main first power rail (which will not result in a data loss when the system is performing a Power-On Self-Test (POST)). If that PSU is a PSU that is compatible with the valid PSU configuration for the first power system according to the PSU mismatch check, power from that PSU to the main first power rail may be maintained. The programmable logic device may then enable all of the PSUs that are included in the first power system and that belong to the valid PSU configuration for the first power system according to the PSU mismatch check to provide power to the main first power rail.

Concurrent with, or subsequent to, enabling the valid PSU configuration in the first power system, the programmable logic device may also enable a single PSU that is included in the second power system and that is coupled to the main second power rail in order to allow that PSU to provide power to the main second power rail, thus powering the controller that performs the PSU mismatch check for all of the PSUs included in the second power system and coupled to the main second power rail. Upon completion of the PSU mismatch check for the PSUs included in the second power system, the controller may report to the programmable logic device all of the PSUs that are included in the second power system, coupled to the main second power rail, and that belong to a valid PSU configuration for the second power system. If the PSU that is included in the second power system and currently enabled to allow the controller to perform the PSU mismatch check is a PSU that is incompatible with the valid PSU configuration for the second power system according to the PSU mismatch check, the programmable logic device may disable that PSU from providing power to the main second power rail (which will not result in a data loss when the system is performing a Power-On Self-Test (POST).) If that PSU is a PSU that is compatible with the valid PSU configuration for the second power system according to the PSU mismatch check, power from that PSU to the main second power rail may be maintained. The programmable logic device may then enable all of the PSUs that are included in the second power system and that belong to the valid PSU configuration for the second power system according to the PSU mismatch check to provide power to the main second power rail. The method 500 prevents PSUs that are mismatched and/or incompatible with each other or the system from being enabled to provide power to the main first power rail or the main second power rail at the same time, which may prevent errors, damage to the computing device, and other issues that result from mismatched power supplies. The systems and methods of the present disclosure may also free the system from requiring auxiliary power rail circuitry for the controller that takes up valuable space in the computing device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:
1. A multi-power rail power supply unit (PSU) mismatch detection system, comprising:
 a first power rail that is coupled to a plurality of first PSU slots;
 a second power rail that is coupled to a plurality of second PSU slots; and at least one controller that is coupled to the first power rail and each of the plurality of first PSU slots, and that is coupled to the second power rail and each of the plurality of second PSU slots, wherein the at least one controller is configured to:
  receive a request to enable the first power rail and the second power rail;
  enable transmission of power to the first power rail from a PSU that is coupled to a first of the plurality of first PSU slots, and enable transmission of power to the second power rail from a PSU that is coupled to a first of the plurality of second PSU slots;
  perform a first power rail PSU mismatch check on respective PSUs coupled to the plurality of first PSU slots, and perform a second power rail PSU mismatch check on respective PSUs coupled to the plurality of second PSU slots,
  wherein the first PSU mismatch check is configured to:
    identify a compatibility of the PSUs coupled to the plurality of first PSU slots using PSU parameters associated with each of the PSUs coupled to the plurality of first PSU slots; and
    is performed while only the PSU that is coupled to the first of the plurality of first PSU slots is providing power to the first power rail, and
  wherein the second PSU mismatch check is configured to identify a compatibility of the PSUs coupled to the plurality of second PSU slots using PSU parameters associated with each of the PSUs coupled to the plurality of second PSU slots;
  determine one or more compatible PSUs that are coupled to the plurality of first PSU slots and that belong to a first compatible PSU configuration identified using the first power rail PSU mismatch check, and determine one or more compatible PSUs that are coupled to the plurality of second PSU slots and that belong to a second compatible PSU configuration identified using the second power rail PSU mismatch check; and
  enable transmission of power to the first power rail from the one or more compatible PSUs that are coupled to the plurality of first PSU slots, and enable transmission of power to the second power rail from the one or more compatible PSUs that are coupled to the plurality of second PSU slots.

2. The system of claim 1, wherein the at least one controller is configured to:
  determine that the power transmitted to the first power rail from the PSU that is coupled to the first of the plurality of first PSU slots is within at least one system threshold, and determine that the power transmitted to the second power rail from the PSU that is coupled to the first of the plurality of second PSU slots is within the at least one system threshold.

3. The system of claim 1, wherein the at least one controller is configured to:
  determine that the power transmitted to the first power rail from the PSU that is coupled to the first of the plurality of first PSU slots is not within at least one system threshold and, in response, disable the PSU that is coupled to the first of the plurality of first PSU slots from transmitting power to the first power rail;
  enable the transmission of power to the first power rail from a PSU that is coupled to a second of the plurality of first PSU slots; and
  determine that the power transmitted to the first power rail from the PSU that is coupled to the second of the plurality of first PSU slots is within the at least one system threshold.

4. The system of claim 1, wherein the at least one controller is configured to:
  determine that the PSU that is coupled to the first of the plurality of first PSU slots is not included in the one or more compatible PSUs that belong to the first compatible PSU configuration identified using the first power rail PSU mismatch check and, in response, disable the transmission of power to the power rail from the PSU that is coupled to the first of the plurality of first PSU slots before enabling transmission of power to the first power rail from the one or more compatible PSUs that are coupled to the plurality of first PSU slots.

5. The system of claim 1, wherein the at least one controller includes a first controller that is configured to enable the transmission of power to the first power rail from the one or more compatible PSUs that are coupled to the plurality of first PSU slots, and to enable the transmission of power to the second power rail from the one or more compatible PSUs that are coupled to the plurality of second PSU slots, and wherein the first controller is further configured to:
  pass control of the plurality of PSUs that are coupled to the plurality of first PSU slots to a second controller in response to enabling the transmission of power to the first power rail from the one or more compatible PSUs that are coupled to the plurality of first PSU slots, and pass control of the plurality of PSUs that are coupled to the plurality of second PSU slots to the second controller in response to enabling the transmission of power to the second power rail from the one or more compatible PSUs that are coupled to the plurality of second PSU slots.

6. The system of claim 1, wherein the at least one controller is configured to:
  determine, following the enabling of the transmission of power to the power rail from the PSU that is coupled to the first of the plurality of first PSU slots, that no indication has been received that indicates that the first power rail PSU mismatch check has been completed and, in response, enable the transmission of power to the first power rail from the each of the plurality of PSUs that are coupled to the plurality of first PSU slots.

7. The system of claim 1, wherein the at least one controller is configured to:
  monitor, prior to the completion of the performance of the first PSU mismatch check, power transmitted to the first power rail from the PSU that is coupled to the first of the plurality of first PSU slots;
  determine, based on the monitoring, that the power transmitted from to the first power rail from the PSU that is coupled to the first of the plurality of first PSU slots is not within a system threshold and, in response, disable the transmission of power to the first power rail from the PSU that is coupled to the first of the plurality of first PSU slots; and
  enable the transmission of power to the first power rail from a PSU that is coupled to a second of the plurality of first PSU slots.

8. An Information Handling System (IHS), comprising:
  a processing system; and
  a memory system that is coupled to the processing system and that includes instructions that, when executed by the processing system, cause the processing system to provide at least one controller that is configured to:
receive a request to enable a first power rail and a second power rail;
enable transmission of power to the first power rail from a PSU that is coupled to a first of a plurality of first PSU slots, and enable transmission of power to the second power rail from a PSU that is coupled to a first of a plurality of second PSU slots;
perform a first power rail PSU mismatch check on respective PSUs coupled to the plurality of first PSU slots, and perform a second power rail PSU mismatch check on respective PSUs coupled to the plurality of second PSU slots,
wherein the first PSU mismatch check is configured to:
identify a compatibility of the PSUs coupled to the plurality of first PSU slots using PSU parameters associated with each of the PSUs coupled to the plurality of first PSU slots; and
is performed while only the PSU that is coupled to the first of the plurality of first PSU slots is providing power to the first power rail, and
wherein the second PSU mismatch check is configured to identify a compatibility of the PSUs coupled to the plurality of second PSU slots using PSU parameters associated with each of the PSUs coupled to the plurality of second PSU slots;
determine one or more compatible PSUs that are coupled to the plurality of first PSU slots and that belong to a first compatible PSU configuration identified using the first power rail PSU mismatch check, and determine one or more compatible PSUs that are coupled to the plurality of second PSU slots and that belong to a second compatible PSU configuration identified using the second power rail PSU mismatch check; and
enable transmission of power to the first power rail from the one or more compatible PSUs that are coupled to the plurality of first PSU slots, and enable transmission of power to the second power rail from the one or more compatible PSUs that are coupled to the plurality of second PSU slots.

9. The IHS of claim 8, wherein the at least one controller is configured to:
determine that the power transmitted to the first power rail from the PSU that is coupled to the first of the plurality of first PSU slots is within at least one system threshold, and determine that the power transmitted to the second power rail from the PSU that is coupled to the first of the plurality of second PSU slots is within the at least one system threshold.

10. The IHS of claim 8, wherein the at least one controller is configured to:
determine that the power transmitted to the first power rail from the PSU that is coupled to the first of the plurality of first PSU slots is not within at least one system threshold and, in response, disable the PSU that is coupled to the first of the plurality of first PSU slots from transmitting power to the first power rail;
enable the transmission of power to the first power rail from a PSU that is coupled to a second of the plurality of first PSU slots; and
determine that the power transmitted to the first power rail from the PSU that is coupled to the second of the plurality of first PSU slots is within the at least one system threshold.

11. The IHS of claim 8, wherein the at least one controller is further configured to:
determine that the PSU that is coupled to the first of the plurality of first PSU slots is not included in the one or more compatible PSUs that belong to the first compatible PSU configuration identified using the first power rail PSU mismatch check and, in response, disable the transmission of power to the power rail from the PSU that is coupled to the first of the plurality of first PSU slots before enabling transmission of power to the first power rail from the one or more compatible PSUs that are coupled to the plurality of first PSU slots.

12. The IHS of claim 8, wherein the at least one controller includes a first controller that is configured to enable the transmission of power to the first power rail from the one or more compatible PSUs that are coupled to the plurality of first PSU slots, and to enable the transmission of power to the second power rail from the one or more compatible PSUs that are coupled to the plurality of second PSU slots, and wherein the first controller is further configured to:
pass control of the plurality of PSUs that are coupled to the plurality of first PSU slots to a second controller in response to enabling the transmission of power to the first power rail from the one or more compatible PSUs that are coupled to the plurality of first PSU slots, and pass control of the plurality of PSUs that are coupled to the plurality of second PSU slots to the second controller in response to enabling the transmission of power to the second power rail from the one or more compatible PSUs that are coupled to the plurality of second PSU slots.

13. The IHS of claim 8, wherein the at least one controller is configured to:
determine, following the enabling of the transmission of power to the power rail from the PSU that is coupled to the first of the plurality of first PSU slots, that no indication has been received that indicates that the first power rail PSU mismatch check has been completed and, in response, enable the transmission of power to the first power rail from the each of the plurality of PSUs that are coupled to the plurality of first PSU slots.

14. The IHS of claim 8, wherein the at least one controller is further configured to:
monitor, prior to the completion of the performance of the first PSU mismatch check, power transmitted to the first power rail from the PSU that is coupled to the first of the plurality of first PSU slots;
determine, based on the monitoring, that the power transmitted from to the first power rail from the PSU that is coupled to the first of the plurality of first PSU slots is not within a system threshold and, in response, disable the transmission of power to the first power rail from the PSU that is coupled to the first of the plurality of first PSU slots; and
enable the transmission of power to the first power rail from a PSU that is coupled to a second of the plurality of first PSU slots.

15. A method for providing power from a plurality of compatible Power Supply Units (PSUs) to multiple power rails, comprising:
receiving, by at least one controller, a request to enable a first power rail and a second power rail;
enabling, by the at least one controller, transmission of power to the first power rail from a PSU that is coupled to a first of a plurality of first PSU slots, and enabling transmission of power to the second power rail from a PSU that is coupled to a first of a plurality of second PSU slots;

performing, by the at least one controller, a first power rail PSU mismatch check on respective PSUs coupled to the plurality of first PSU slots, and performing a second power rail PSU mismatch check on respective PSUs coupled to the plurality of second PSU slots, wherein the first PSU mismatch check is configured to:
identify a compatibility of the PSUs coupled to the plurality of first PSU slots using PSU parameters associated with each of the PSUs coupled to the plurality of first PSU slots; and
is performed while only the PSU that is coupled to the first of the plurality of first PSU slots is providing power to the first power rail, and wherein the second PSU mismatch check is configured to identify a compatibility of the PSUs coupled to the plurality of second PSU slots using PSU parameters associated with each of the PSUs coupled to the plurality of second PSU slots;

determining, by the at least one controller, one or more compatible PSUs that are coupled to the plurality of first PSU slots and that belong to a first compatible PSU configuration identified using the first power rail PSU mismatch check, and determining one or more compatible PSUs that are coupled to the plurality of second PSU slots and that belong to a second compatible PSU configuration identified using the second power rail PSU mismatch check; and enabling, by the at least one controller, transmission of power to the first power rail from the one or more compatible PSUs that are coupled to the plurality of first PSU slots, and enabling transmission of power to the second power rail from the one or more compatible PSUs that are coupled to the plurality of second PSU slots.

16. The method of claim 15, further comprising:
determining, by the at least one controller, that the power transmitted to the first power rail from the PSU that is coupled to the first of the plurality of first PSU slots is within at least one system threshold, and determining that the power transmitted to the second power rail from the PSU that is coupled to the first of the plurality of second PSU slots is within the at least one system threshold.

17. The method of claim 15, further comprising:
determining, by the at least one controller, that the power transmitted to the first power rail from the PSU that is coupled to the first of the plurality of first PSU slots is not within at least one system threshold and, in response, disabling the PSU that is coupled to the first of the plurality of first PSU slots from transmitting power to the first power rail;

enabling, by the at least one controller, the transmission of power to the first power rail from a PSU that is coupled to a second of the plurality of first PSU slots; and determining, by the at least one controller, that the power transmitted to the first power rail from the PSU that is coupled to the second of the plurality of first PSU slots is within the at least one system threshold.

18. The method of claim 17, wherein the at least one controller includes a first controller that enables the transmission of power to the first power rail from the one or more compatible PSUs that are coupled to the plurality of first PSU slots, and that enables the transmission of power to the second power rail from the one or more compatible PSUs that are coupled to the plurality of second PSU slots, and wherein the method further comprises:

passing, by the first controller, control of the plurality of PSUs that are coupled to the plurality of first PSU slots to a second controller in response to enabling the transmission of power to the first power rail from the one or more compatible PSUs that are coupled to the plurality of first PSU slots, and passing control of the plurality of PSUs that are coupled to the plurality of second PSU slots to the second controller in response to enabling the transmission of power to the second power rail from the one or more compatible PSUs that are coupled to the plurality of second PSU slots.

19. The method of claim 15, further comprising:
determining, by the at least one controller following the enabling of the transmission of power to the power rail from the PSU that is coupled to the first of the plurality of first PSU slots, that no indication has been received that indicates that the first power rail PSU mismatch check has been completed and, in response, enabling the transmission of power to the first power rail from the each of the plurality of PSUs that are coupled to the plurality of first PSU slots.

20. The method of claim 15, further comprising:
monitoring, by the at least one controller prior to the completion of the performance of the first PSU mismatch check, power transmitted to the first power rail from the PSU that is coupled to the first of the plurality of first PSU slots;

determining, by the at least one controller based on the monitoring, that the power transmitted from to the first power rail from the PSU that is coupled to the first of the plurality of first PSU slots is not within a system threshold and, in response, disabling the transmission of power to the first power rail from the PSU that is coupled to the first of the plurality of first PSU slots; and enabling, by the at least one controller, the transmission of power to the first power rail from a PSU that is coupled to a second of the plurality of first PSU slots.

* * * * *